US007124847B2

(12) United States Patent
Girouard et al.

(10) Patent No.: US 7,124,847 B2
(45) Date of Patent: *Oct. 24, 2006

(54) FRAME CONSTRUCTION FOR A VEHICLE

(75) Inventors: Bruno Girouard, Montreal (CA);
Berthold Fecteau, Richmond (CA);
Jérôme Wubbolts, Orford (CA);
Anne-Marie Dion, Granby (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/127,152

(22) Filed: May 12, 2005

(65) Prior Publication Data

US 2005/0205320 A1    Sep. 22, 2005

Related U.S. Application Data

(63) Continuation of application No. 09/877,212, filed on Jun. 11, 2001, and a continuation-in-part of application No. 09/472,133, filed on Dec. 23, 1999, now abandoned.

(60) Provisional application No. 60/237,384, filed on Oct. 4, 2000.

(30) Foreign Application Priority Data

Dec. 23, 1998   (CA)   .................... 2256944

(51) Int. Cl.
*B62M 27/02* (2006.01)
(52) U.S. Cl. .............. 180/184; 180/182; 180/186; 180/190; 296/203.01; 296/205
(58) Field of Classification Search ........... 180/182, 180/184, 186, 190, 183; 296/203.01, 205
See application file for complete search history.

(56) References Cited

U.S. PATENT DOCUMENTS

D175,866 S    10/1955   Strunk (Continued)

FOREIGN PATENT DOCUMENTS

CA    2251769    8/1995

OTHER PUBLICATIONS

Creations J.P.L. Inc. Advertisement (advertising seat designs).
Magazine Article: Dirt Wheels/Jan. 1991.

(Continued)

*Primary Examiner*—Lesley D. Morris
*Assistant Examiner*—Marc A. Scharich
(74) *Attorney, Agent, or Firm*—Osler, Hoskin & Harcourt LLP

(57) ABSTRACT

A frame assembly is described including a tunnel, an engine cradle disposed forward of the tunnel and connected thereto, and a sub-frame disposed forward of the engine cradle and connected thereto. A forward support assembly extends upwardly from the subframe. An upper column extends upwardly from the engine cradle to connect with the forward support assembly. A rear brace assembly extends upwardly from the tunnel to connect with the forward support assembly and the upper column. In one embodiment, the frame assembly further includes an engine disposed in the engine cradle. An endless track is operatively connected to the engine and disposed beneath the tunnel for propulsion. A pair of skis is operatively connected to a steering device for steering. In another embodiment, the frame assembly further includes an engine disposed in the engine cradle. A rear wheel is operatively connected to the engine and disposed beneath the tunnel for propulsion, and two front wheels are operatively connected to a steering device for steering.

15 Claims, 33 Drawing Sheets

U.S. PATENT DOCUMENTS

| | | | |
|---|---|---|---|
| 3,583,506 A | 6/1971 | Preble | |
| 3,583,507 A | 6/1971 | Trautwein | |
| 3,622,196 A | 11/1971 | Sarra | |
| 3,627,073 A | 12/1971 | Grimm | |
| 3,653,453 A | 4/1972 | Titola | |
| 3,804,455 A * | 4/1974 | Gorski | 296/205 |
| 3,981,373 A | 9/1976 | Irvine | |
| 4,204,581 A | 5/1980 | Husted | |
| 4,204,582 A | 5/1980 | Van Soest | |
| 4,407,383 A | 10/1983 | Enokimoto et al. | |
| 4,502,560 A | 3/1985 | Hisatomi | |
| 4,613,006 A | 9/1986 | Moss et al. | |
| 4,620,604 A | 11/1986 | Talbot | |
| 4,633,964 A | 1/1987 | Boyer et al. | |
| 4,699,229 A | 10/1987 | Hirose et al. | |
| 4,787,470 A | 11/1988 | Badsey | |
| 4,848,503 A | 7/1989 | Yasui et al. | |
| 5,370,198 A | 12/1994 | Karpik | |
| 5,474,146 A | 12/1995 | Yoshioka et al. | |
| 5,564,517 A | 10/1996 | Levasseur | |
| 5,586,614 A | 12/1996 | Kouchi | |
| 5,660,245 A * | 8/1997 | Marier et al. | 180/190 |
| 5,904,217 A | 5/1999 | Yamamoto et al. | |
| 5,944,133 A | 8/1999 | Eto | |
| 5,996,717 A * | 12/1999 | Hisadomi | 180/182 |
| 6,170,590 B1 * | 1/2001 | Hisadomi | 180/190 |
| 6,227,323 B1 | 5/2001 | Ashida | |
| 6,234,263 B1 | 5/2001 | Boivin et al. | |
| 6,328,124 B1 * | 12/2001 | Olson et al. | 180/182 |
| 6,343,666 B1 * | 2/2002 | Olson et al. | 180/182 |
| 6,357,543 B1 * | 3/2002 | Karpik | 180/182 |
| 6,446,744 B1 * | 9/2002 | Wubbolts et al. | 180/190 |
| 6,491,125 B1 * | 12/2002 | Girouard et al. | 180/190 |
| 6,499,551 B1 * | 12/2002 | Karpik | 180/190 |
| 6,561,302 B1 * | 5/2003 | Karpik | 180/291 |
| 6,604,594 B1 * | 8/2003 | Wubbolts et al. | 180/186 |
| 6,655,487 B1 * | 12/2003 | Mallette et al. | 180/190 |
| 6,691,812 B1 * | 2/2004 | Karpik | 180/190 |
| 6,823,957 B1 * | 11/2004 | Girouard et al. | 180/190 |
| 6,889,787 B1 * | 5/2005 | Karpik | 180/190 |
| 2001/0047900 A1 * | 12/2001 | Fecteau et al. | 180/190 |
| 2002/0053477 A1 * | 5/2002 | Karpik | 180/182 |
| 2003/0127265 A1 * | 7/2003 | Watson et al. | 180/190 |
| 2003/0183436 A1 * | 10/2003 | Karpik | 180/190 |
| 2003/0201128 A1 * | 10/2003 | Girouard et al. | 180/190 |
| 2003/0201129 A2 * | 10/2003 | Fecteau et al. | 180/190 |
| 2004/0134702 A1 * | 7/2004 | Karpik | 180/190 |
| 2005/0115754 A1 * | 6/2005 | Watson et al. | 180/190 |
| 2005/0126839 A1 * | 6/2005 | Rasidescu et al. | 180/190 |
| 2005/0205320 A1 * | 9/2005 | Girouard et al. | 180/190 |
| 2005/0205321 A1 * | 9/2005 | Girouard et al. | 180/190 |
| 2005/0205322 A1 * | 9/2005 | Girouard et al. | 180/190 |

OTHER PUBLICATIONS

Brochure of Yamaha Snow Scout: Montoneige Quebec, 1987, vol. 13, No. 1 (CA).

Brochure of Yamaha Snow Scout: Snowmobile Brochure Business, 3rd Annual.

Magazine Supertrax/Jan. 1999.

Snow Tech, Spring 1999, Article "Special Report" Redline Snowmobiles, pp. 28-31.

Montoneige Quebec, vol. 25-No. 3, Nov. 1999, pp. 1 (front cover), 6, 31 and 58.

Ski-Doo Parts Catalogue No. 480 1263 00, 1991, pp. C12, D1, D2 and D3.

* cited by examiner

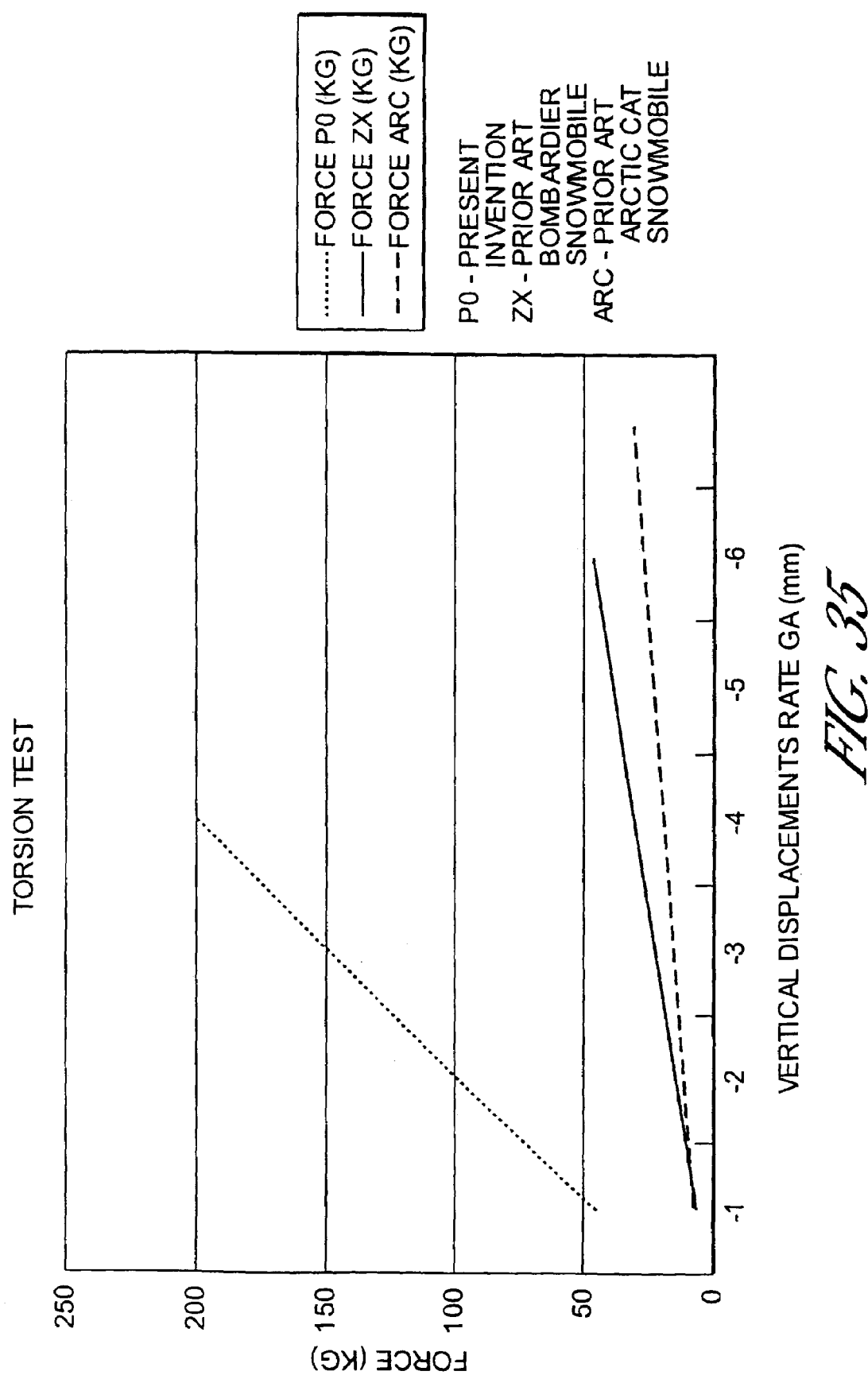

FRAME CONSTRUCTION FOR A VEHICLE

This application is a continuation application of U.S. application Ser. No. 09/877,212, filed on Jun. 11, 2001, which is incorporated herein by reference. Through 09/877,212, this application claims priority to U.S. application Ser. No. 60/237,384, filed Oct. 4, 2000, and is a continuation-in-part of U.S. application Ser. No. 09/472,133, entitled "IMPROVED VEHICLE" filed on Dec. 23, 1999, now abandoned, the entire contents of both applications are incorporated herein by reference. Through U.S. application Ser. No. 09/472,133, this application claims priority to Canadian Patent Application No. 2,256,944, filed Dec. 23, 1998, the entire contents of which are incorporated herein by reference. The present application also incorporates by reference U.S. application Ser. No. 09/472,134, entitled "SNOWMOBILE," filed Dec. 23, 1999, and U.S. patent application Ser. No. 60/230,432, entitled "A NOVEL THREE-WHEELED VEHICLE," filed Sep. 6, 2000.

1. FIELD OF THE INVENTION

The present invention relates to the construction of vehicles such as snowmobiles, all terrain vehicles ("ATVs"), and other similar vehicles. More specifically, the present invention concerns the construction of a frame and related structural elements that enhance the ruggedness and ability of such vehicles to operate across a wide variety of different terrains and under a wide variety of conditions. In addition, the present invention concerns the design and construction of a frame for snowmobiles, ATVs, and related vehicles that facilitate the construction of such vehicles with an improved rider positioning.

2. DESCRIPTION OF RELATED ART AND GENERAL BACKGROUND

Snowmobiles, ATVs, and related vehicles (hereinafter, "recreational vehicles," although the appellation should not be construed to be limited only to the vehicles or type of vehicles described herein) often function under similar operating conditions. Despite this, snowmobiles, ATVs, and other recreational vehicles often do not share a common design approach or a commonality of components. This is due, in large part, to the different stresses and strains (mainly at the extremes) that the different vehicles experience during routine operation.

Specifically, snowmobiles are designed with frame assemblies and suspensions that easily absorb the shock of obstacles encountered on groomed trails and in deep snow. They are also designed to handle the forces generated when the snowmobile is driven aggressively (e.g., under racing conditions). In addition, their frame assemblies are designed to provide optimum steering and performance in snow, whether on groomed snowmobile trails (packed snow) or in ungroomed, off-trail areas (powder or natural snow).

ATVs, on the other hand, are designed with suspensions and frame assemblies that are expected to absorb the type of momentarily intense forces associated with more rugged terrain, specifically of the type encountered in forests and woodland environments. In addition, an ATV frame is designed to withstand forces associated with significant torsional stresses that are typical when an ATV straddles large objects or when the wheels are disposed at different elevations because of the extreme terrain in which the ATV often operates.

It should be kept in mind that the design parameters of the frame assemblies for these two vehicles are also different. In a snowmobile, the frame at the rear of the vehicle is only about 15 inches wide. This is sufficient to cover the endless track that propels the vehicle and to provide a seating area for the driver. The narrow width, however, imposes certain design restrictions on the vehicle. ATVs, on the other hand, are designed with a significantly wider base, which is typically 50 inches or more. This width also imposes certain design restrictions on the ATV.

Snowmobiles and ATVs are also designed with different centers of gravity. In the typical snowmobile, the center of gravity is very low. This assists the snowmobile rider when he or she is on a slope or in a turn because the snowmobile will naturally resist the tendency to lean or tip. ATVs, on the other hand, like off-road trucks and the like, are expected to traverse taller objects. Accordingly, their frames are designed so that the engine and seating area is further from the ground than a snowmobile. Thus, ATVs have higher centers of gravity.

Naturally, since both vehicles are designed with off-road use in mind, there are similarities between the two. Both are provided with rugged frames. Moreover, both are provided with strong suspensions. Despite this, there have been few vehicles designed that capitalize on these similarities.

Recognizing this basic similarity between the two vehicles, some after-market designers have developed kits that permit snowmobiles to be converted to ATVs and vice-versa. However, such kits are limited in their effectiveness because the two vehicles are so completely different from one another in their basic designs. The resulting, converted vehicles suffer from drawbacks that are associated with the purpose for which the primary vehicle was designed. For example, a snowmobile converted to an ATV is not expected to be able to traverse the same type of terrain as a pure ATV. Similarly, an ATV that has been converted to a snowmobile is not expected to be able to traverse the same terrain that a pure snowmobile can.

Partly due to the consumer's use of snowmobiles in the winter and ATVs in the summer, the evolution of both snowmobiles and ATVs has converged in recent years. Also, in recent years, designers have begun to apply the same basic design concepts to both vehicle types. What has resulted is a recognition that vehicles may be designed that incorporate many of the same structural elements and follow very similar design approaches.

The basis for the present invention stems from this basic recognition.

SUMMARY OF THE INVENTION

It is, therefore, an object of the present invention to provide a frame assembly with a tunnel, an engine cradle disposed forward of the tunnel and connected thereto, and a sub-frame disposed forward of the engine cradle and connected thereto. The frame assembly further includes a forward support assembly extending upwardly from the sub-frame, an upper column extending upwardly from the engine cradle to connect with the forward support assembly, and a rear brace assembly extending upwardly from the tunnel to connect with the forward support assembly and the upper column.

It is another object of the present invention to provide a frame assembly wherein the forward support assembly, the upper column, and the rear brace assembly connect at an apex above the upper column.

Another object of the present invention is to provide a frame assembly where the forward support assembly and the rear brace assembly form a pyramidal construction.

A further object of the present invention is to provide a frame assembly further including a steering bracket connected at the apex for supporting a steering shaft at its upper end. In an alternate embodiment, the steering bracket may include a plurality of pairs of holes for positioning of the steering shaft in a plurality of positions.

One other object of the present invention is to provide a frame assembly that also includes an engine disposed in the engine cradle and an endless track operatively connected to the engine and disposed beneath the tunnel for propulsion. In this embodiment, a pair of skis are operatively connected to a steering device for steering.

Still another object of the present invention is to provide a frame assembly with an engine disposed in the engine cradle and a rear wheel operatively connected to the engine and disposed beneath the tunnel for propulsion. In this embodiment, two front wheels operatively connected to a steering device for steering.

It is yet another object of the present invention to provide a frame assembly for a vehicle that includes a tunnel and an engine cradle adapted to receive an engine therein. A rear brace assembly is attached to the tunnel at a point between its front and rear ends and extends upwardly therefrom. A forward support assembly is attached to the rear brace assembly and extends forwardly and downwardly therefrom. In a further variation of this frame assembly, the rear brace assembly comprises a left and a right leg and the forward support assembly comprises a left and a right leg. The left and right legs of the rear brace assembly and the forward support assembly connect to one another at an apex to form a pyramidal structure above the tunnel and engine cradle.

Still other objects of the present invention will be made apparent by the discussion that follows.

BRIEF DESCRIPTION OF THE DRAWINGS

The invention will be more fully described in conjunction with the following drawings wherein:

FIG. 35 is a graph showing the vertical displacement rate of the frame of the present invention in comparison with a prior art Bombardier snowmobile (the ZX™ series) and a prior art snowmobile made by Arctic Cat.

DESCRIPTION OF THE PREFERRED EMBODIMENTS

Before delving into the specific details of the present invention, it should be noted that the conventions "left," "right," "front," and "rear" are defined according to the normal, forward travel direction of the vehicle being discussed. As a result, the "left" side of a snowmobile is the same as the left side of the rider seated in a forward-facing position on the vehicle (or travelling in a forward direction on the vehicle).

Figure 1:
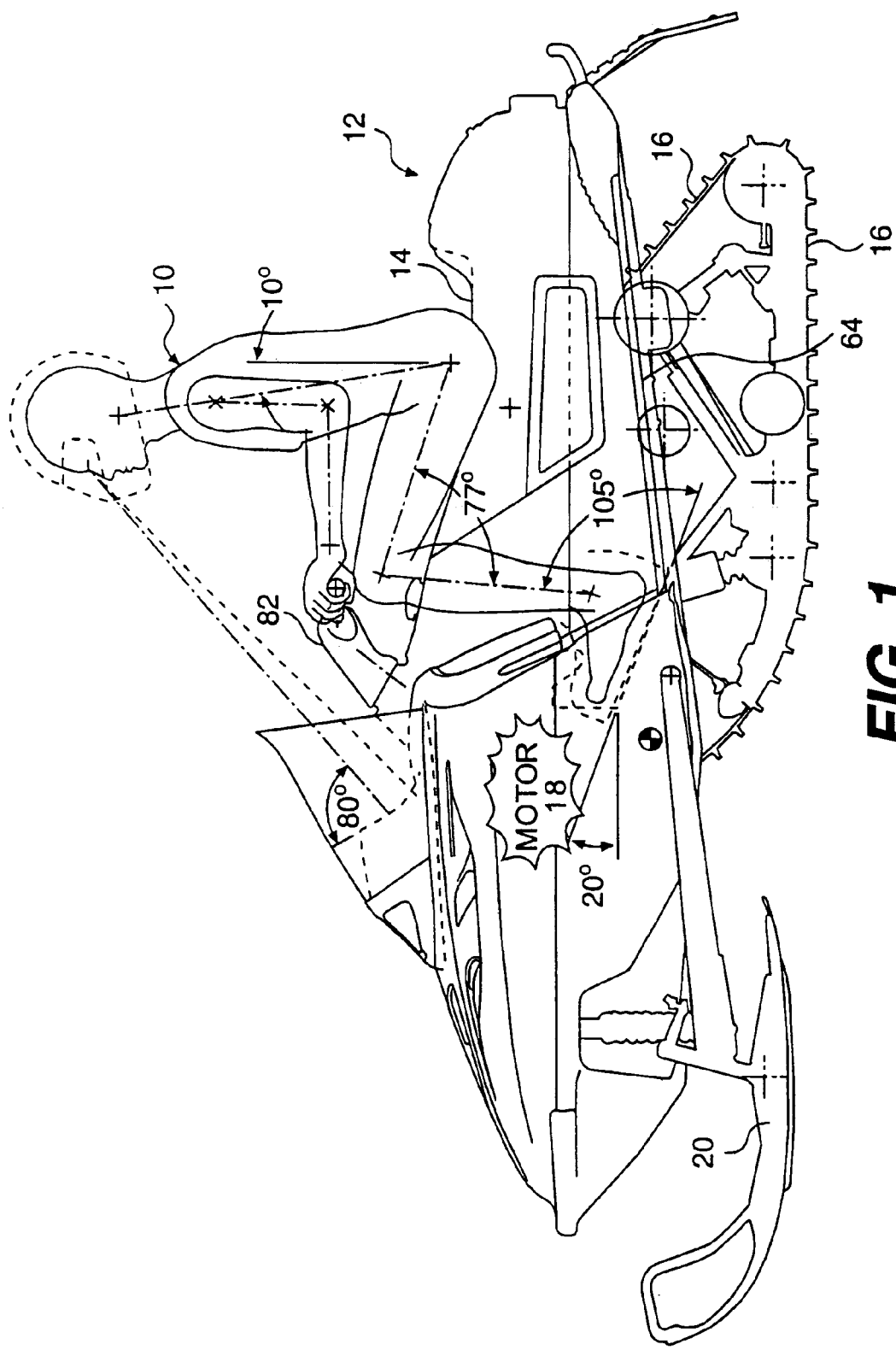
FIG. 1 is a side-view schematic illustration of a prior art snowmobile, showing the prior art positioning of a rider thereon.

FIG. 1 illustrates a rider operator 10 sitting on a prior art snowmobile 12. Rider 10 is positioned on seat 14, with his weight distributed over endless track 16. Motor 18 (shown in general detail) is located over skis 20. As with any snowmobile, endless track 16 is operatively connected to motor (or engine) 18 to propel snowmobile 12 over the snow. Motor or engine 18 typically is a two-stroke internal combustion engine. Alternatively, a 4-stroke internal combustion engine may be substituted therefor. In addition, any suitable engine may be substituted therefor.

Figure 2:
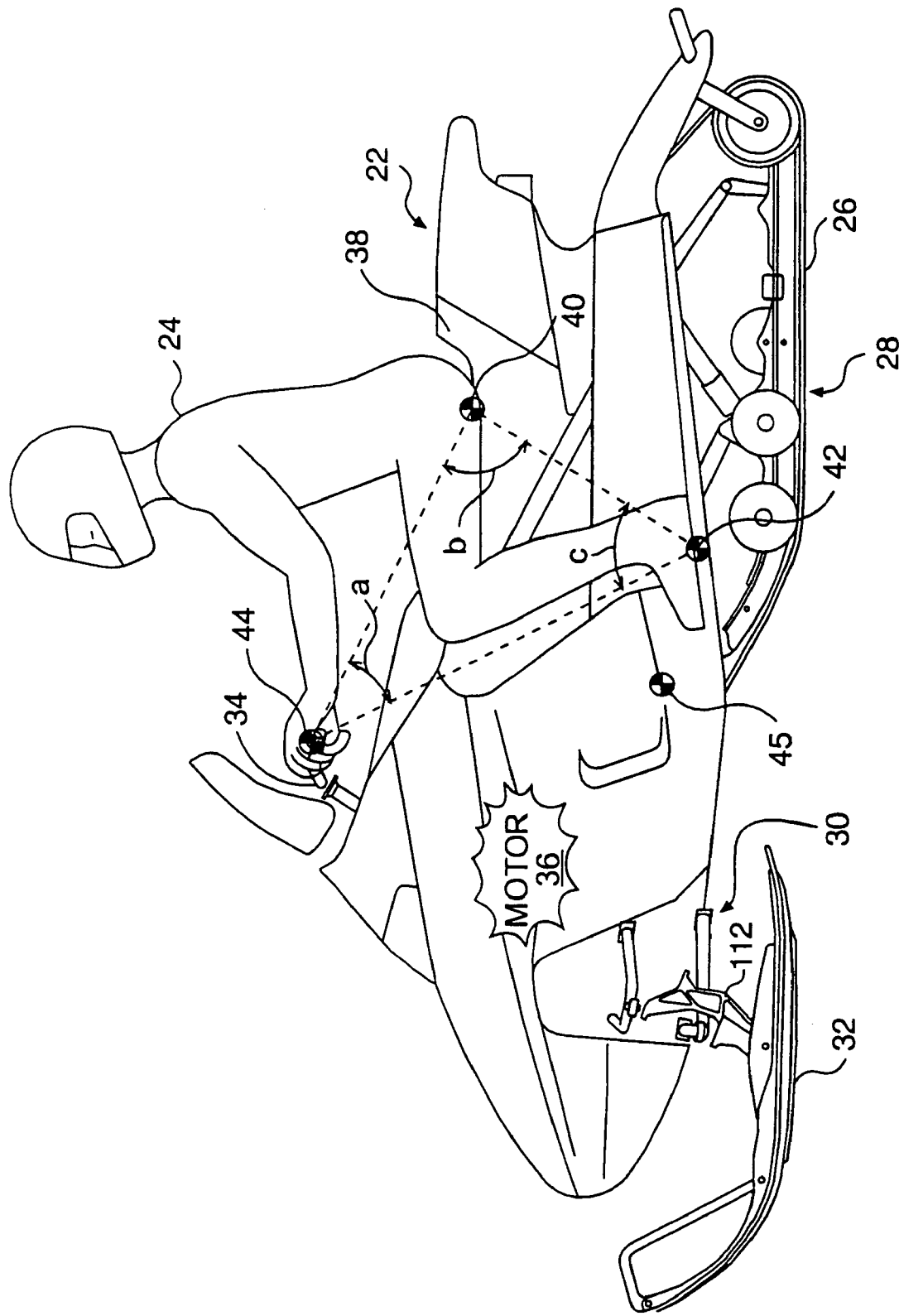
FIG. 2 is a side view illustration of the exterior of a snowmobile constructed according to the teachings of the present invention, also showing the positioning of a rider thereon.

FIG. 2 provides a side view of a snowmobile 22 constructed according to the teachings of the present invention. Here, rider/operator 24 is shown in a more forward, motor cross racing-like position, which is one of the aspects of the present invention. In this position, the weight of operator 24 is forward of the position of rider 10 in the prior art example.

The positioning of rider 24 closer to motor 36 offers several advantages that are not achieved by the prior art. For example, since rider 24 is positioned closer to the engine 36, the center of gravity of rider 24 is closer to the center of gravity of the vehicle, which is often at the drive axle of the vehicle or near thereto. In other words, rider 24 has his weight distributed more evenly over the center of gravity of the vehicle. As a result, when the vehicle traverses rough terrain, rider 24 is better positioned so that he does not experience the same impact from an obstacle as rider 10 on snowmobile 12. The improved rider positioning illustrated in FIG. 2 also improves the rider's ability to handle the vehicle.

FIG. 2 illustrates the basic elements of snowmobile 22. Snowmobile 22 includes an endless track 26 at its rear for propulsion. A rear suspension 28 connects endless track 26 to the vehicle frame. Snowmobile 22 also includes a front suspension 30. Skis 32, which are operatively connected to handlebars 34, are suspended from the front suspension 30 for steering the vehicle. A motor or engine (preferably, an internal combustion engine) 36 is located at the front of snowmobile 22, above skis 32. Operator 24 is seated on a seat 38, which is positioned above the endless track 26.

Three positional points of particular relevance to the present invention are also shown in FIG. 2. Specifically, seat position 40, foot position 42, and hand position 44 of operator 24 are shown. In the modified seating position of operator 24, which is made possible by the teachings of the present invention, hand position 44 is forward of foot position 42, which is forward of seat position 40. The three positions define three angles, a, b, and c between them that help to define the seating position of operator 24, which permits rider 24 to be closer to center of gravity 45 of the vehicle. Moreover, hand position 44 is forward of center of gravity 45 of snowmobile 22.

Figure 3:
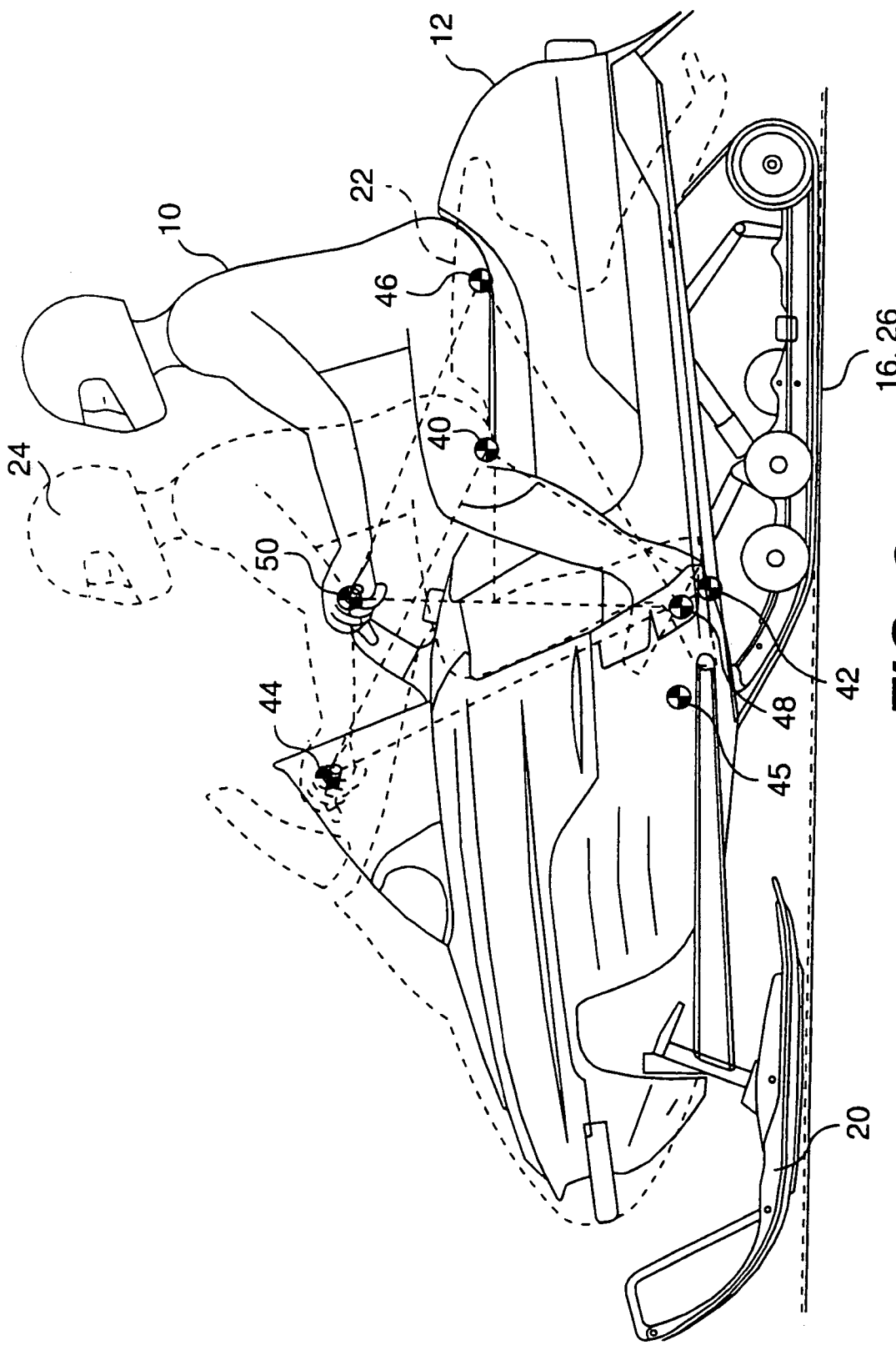
FIG. 3 is an overlay comparison between the a prior art snowmobile (of the type depicted in FIG. 1) and a snowmobile constructed according to the teachings of the present invention (as shown in FIG. 2), illustrating the difference in passenger positioning, among other features.

FIG. 3 provides an overlay between prior art snowmobile 12 and snowmobile 22 constructed according to the teachings of the present invention. Rider 10 (of prior art snowmobile 12) is shown in solid lines while operator 24 (of snowmobile 22) is shown in dotted lines for comparison. The comparative body positions of rider 10 and operator 24 are shown. As is apparent, the present invention permits the construction of a snowmobile 22 where the rider 24 is in a more forward position. Moreover seat position 40, foot position 42, and hand position 44 differ considerably from seat position 46, foot position 48, and hand position 50 in the prior art snowmobile 12. In this position, the center of gravity of operator 24 is closer to center of gravity 45 of snowmobile 22 than in the prior art example.

Figure 4:
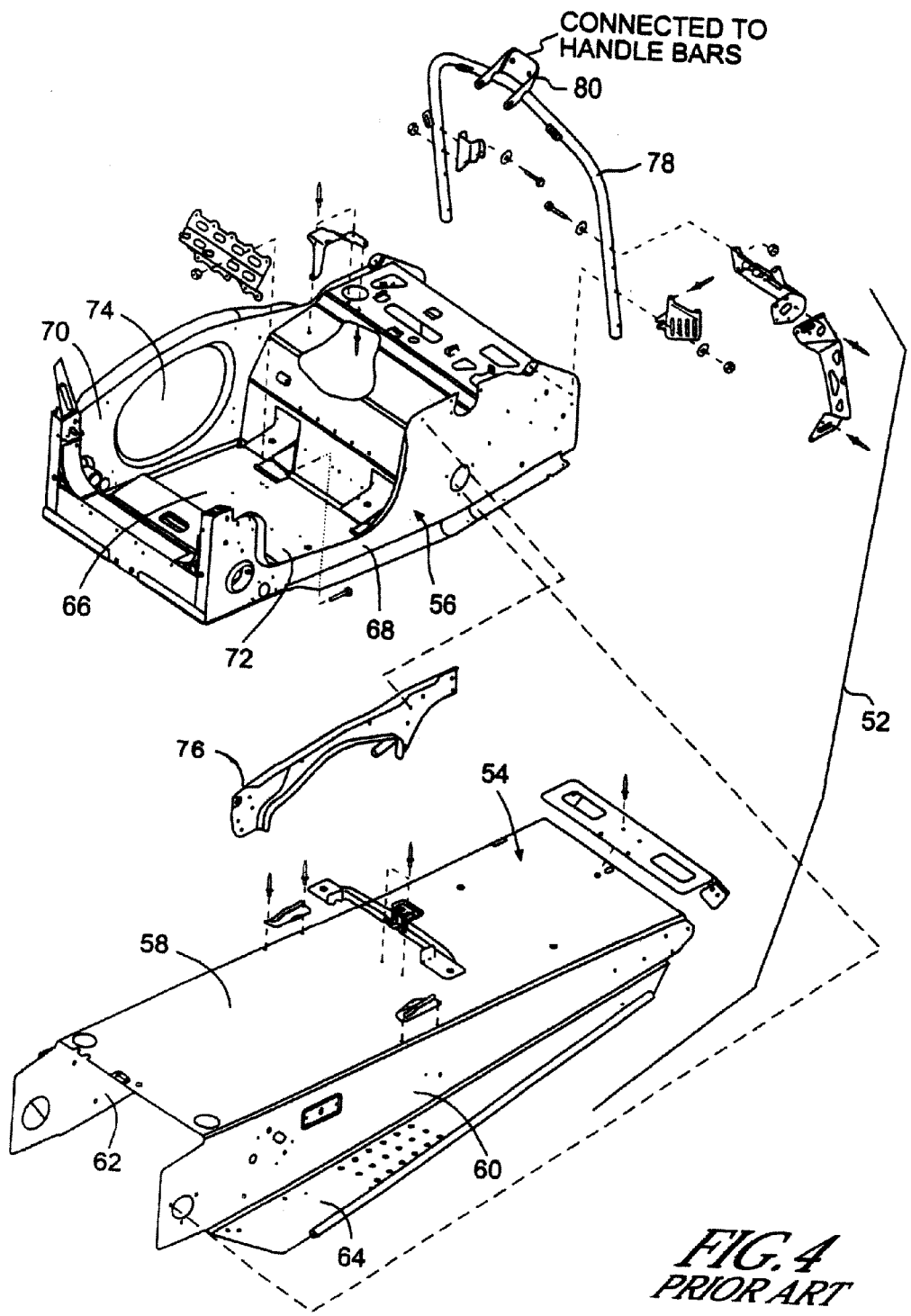
FIG. 4 is an exploded view of a frame assembly representative of the type of construction typical of a snowmobile assembled according to the teachings of the prior art (specifically, the view illustrates the components of a 2000 model year Ski-Doo® Mach™ Z made by Bombardier Inc. of Montréal, Québec, Canada)

As a basis for comparison with the figures that provide the details of the present invention, FIG. 4 provides an exploded view of a frame assembly 52 for a snowmobile constructed according to the teachings of the prior art. Frame assembly 52 includes, as its major components, a tunnel 54 and an engine cradle 56. As illustrated, engine cradle 56 is positioned in front of tunnel 54. Engine cradle 56 receives motor 18.

As shown in FIG. 4, tunnel 54 is basically an inverted U-shaped structure with a top plate 58 integrally formed with left and right side plates 60, 62, respectively. Top plate 58 provides the surface onto with seat 14 is mounted, as would be known to those skilled in the art. Foot boards 64 (of Which only the left foot board is visible in FIG. 4) are integrally formed with the side plates 60, 62 and extend outwardly, perpendicular to the plane of side plates 60, 62. Foot boards 64 provide a location on which rider 10 may place his feet during operation of snowmobile 12. While top plate 58, side plates 60, 62, and foot boards 64 are preferably formed from aluminum, any suitable alternative material may be used, as would be recognized by those skilled in the art. Moreover, while top plate 58, side plates 60, 62 and footboards 64 are shown as an integral structure, an integral construction is not required. Instead, top plate 58, side plates 60, 62, and foot boards 64 may be separately manufactured and connected to one another by any suitable means known in the art.

FIG. 4 also shows that engine cradle 56 is connected to tunnel 54 by any suitable means known to those skilled in the art. For example, engine cradle 56 may be welded or bolted to tunnel 54. Engine cradle includes a bottom plate 66 and left and right side walls 68, 70, which are provided with left and right openings 72, 74, respectively. Left opening 72 is provided so that the shafts for the transmission (typically a continuously variable transmission or CVT) may extend outwardly from left wall 68. The shafts that connect the engine 18 to the transmission pass through left opening 72. A gearbox (not shown) typically is provided on the right side of snowmobile 10. The shafts that connect engine 18 to the gearbox pass through right opening 74. Left and right openings 72, 74 also allow heat from engine 18 to be radiated from engine cradle 56, which assists in cooling engine 18.

As FIG. 4 illustrates, left side wall 68 is provided with a beam 76 that is removably connected thereto. Beam 76 may be removed during servicing, for example, to facilitate access to the engine components and peripheral elements disposed within left opening 72.

FIG. 4 also illustrates the placement of a handlebar support element 78, which connects to the rear of engine cradle 56. Handlebar support element 78 is generally an inverted U-shaped structure that extends upwardly from the combined engine cradle 56 and tunnel 54. A bracket 80 is positioned at the midpoint of handlebar support element 78 and provides structural support for handlebars 82, which is used to steer snowmobile 12.

To provide an improved driver positioning, as described above, the inventors of the present invention appreciated the advantages of moving handlebars 82 forward of the position shown in FIG. 1. To do this, however, required a novel approach to the construction of frame assembly 52 of snowmobile 12. The redesign resulted in the present invention, which is described in detail below.

Figure 5:
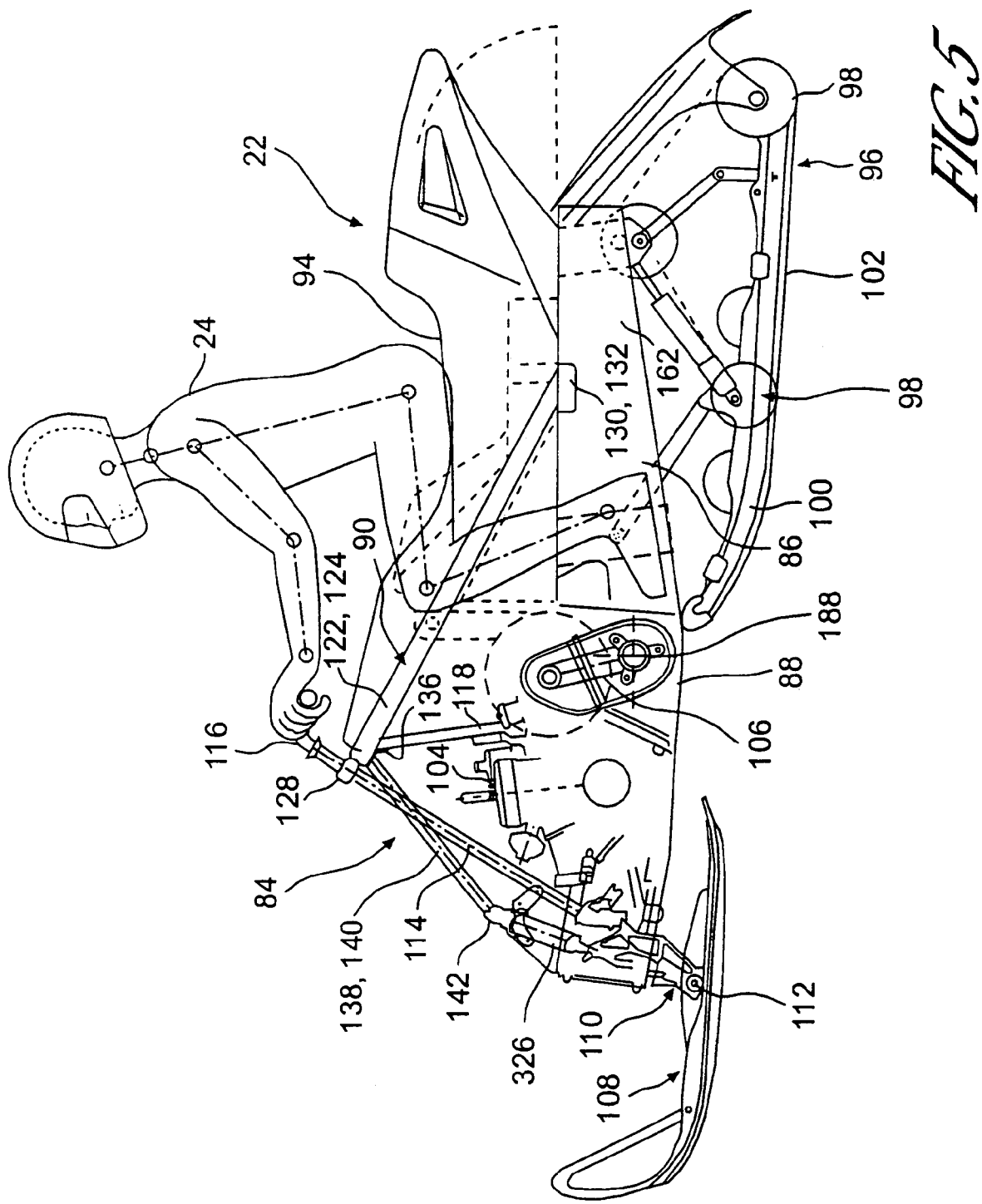
FIG. 5 is a side view schematic illustration of the snowmobile illustrated in FIG. 2, with the fairings and external details removed to show some of the internal components of the snowmobile and their positional relationship to one another.

As illustrated in FIG. 5, snowmobile 22 incorporates a completely redesigned frame assembly 84. Frame assembly 84 includes, among other elements, tunnel 86, engine cradle 88, and over-arching frame elements 90. As with snowmobile 12, snowmobile 22 includes a seat 94 on which rider 24 sits while operating snowmobile 22. Tunnel 86 is connected to a rear suspension 96 that contains a number of wheels 98 disposed on a slide frame 100 around which an endless track 102 rotates to propel snowmobile 22 across the snow.

Endless track 102 is connected to engine 104 (preferably a two or four stroke internal combustion engine) positioned within engine cradle 88. Endless track 102 is connected to engine 104 through a transmission 106, which is preferably a continuously variable transmission (or "CVT"), as is known in the art.

Two skis 108 are provided at the front of snowmobile 22 for steering. Skis 108 are connected to engine cradle 88 through a front suspension 110. Front suspension 110 connects to skis 108 through a pivot joint 112 on the top of skis 108. Skis 108 are operatively connected to a steering shaft 114 that extends over engine 104. Steering shaft 114 is connected, in turn, to handlebars 116, which are used by operator 24 to steer snowmobile 22.

Figure 6:
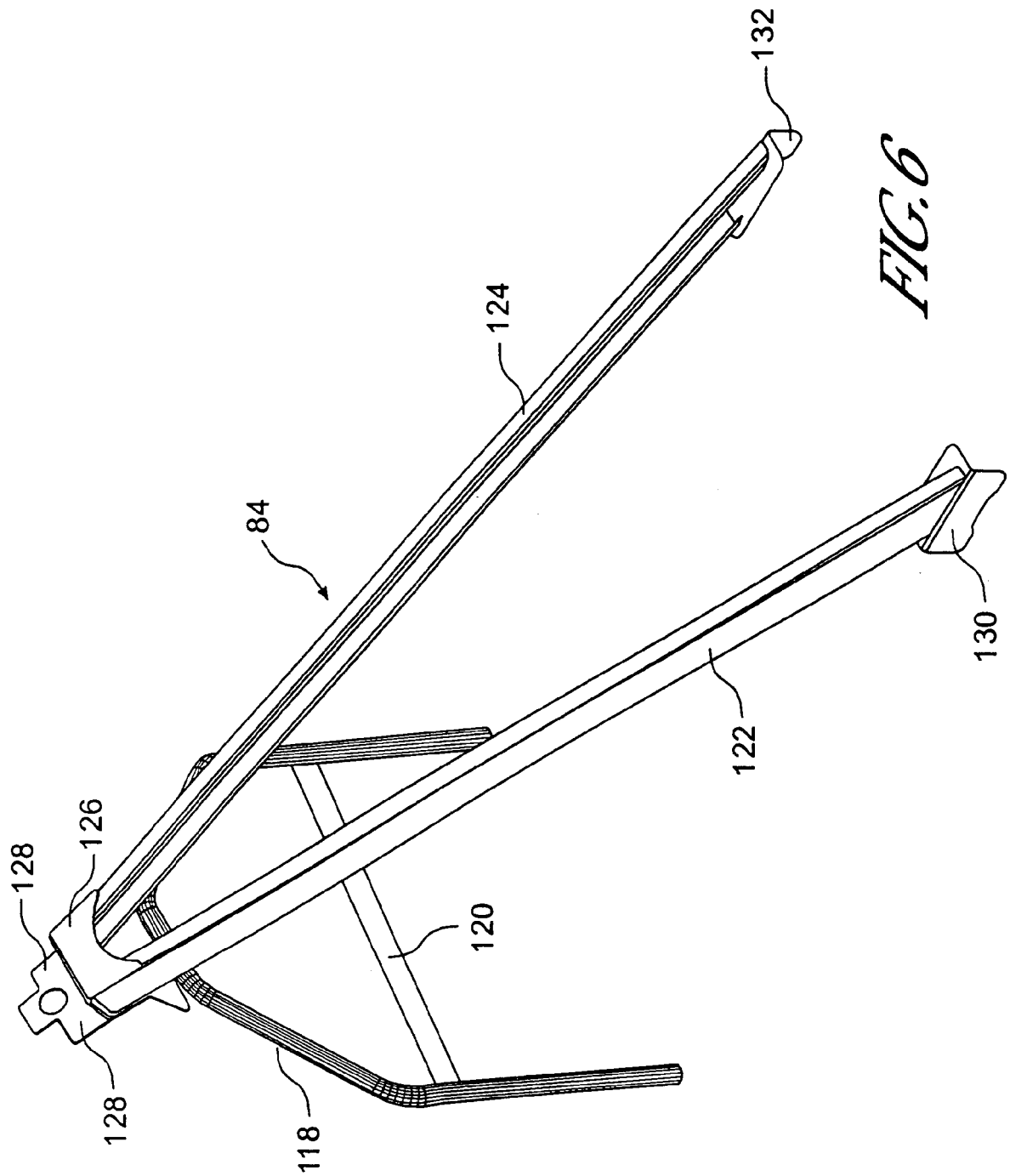
FIG. 6 is a perspective illustration of a portion of the frame assembly of the present invention, specifically the portion disposed toward the rear of the vehicle.

FIG. 6 illustrates the individual elements of rear frame assembly 84 in greater detail. Rear frame assembly 84 includes an upper column 118, which is an inverted U-shaped structural element. If necessary, upper column 118 may be reinforced with a cross-member 120, but this is not needed to practice the present invention. A left brace 122 and a right brace 124 are connected to a bracket 126 above upper column 118. A bushing or bearing (or other similar element) 128 is attached to bracket 126 and accepts steering shaft 114 therethrough. It also secures steering shaft 114 to rear frame assembly 84. Left and right braces 122, 124 include left and right brackets 130, 132 at their lower portions. Left and right brackets 130, 132 secure left and right braces 122, 124 to tunnel 86 of snowmobile 22.

It should be noted that, while the construction of frame assembly 84 is illustrated involves the use of tubular members, frame assembly 84 may also be constructed according to a monocoque or pseudo-monocoque technique. A monocoque construction is one where a single sheet of material is attached to an underlying frame (such as with the construction of an aircraft). The skin applied to the frame adds rigidity to the underlying frame structure. In a similar manner, a pseudo-monocoque technique provides a rigid structure by providing a frame constructed from a single sheet of material.

Instead of constructing frame assembly 84 from a number of tubular members, frame assembly 84 may be constructed from a single sheet of material (such as aluminum) that has been pressed or molded into the appropriate shape using a pseudo-monocoque manufacturing technique. As would be understood by those skilled in the art, this would result in a construction that has a high strength with a low weight.

Figure 7:
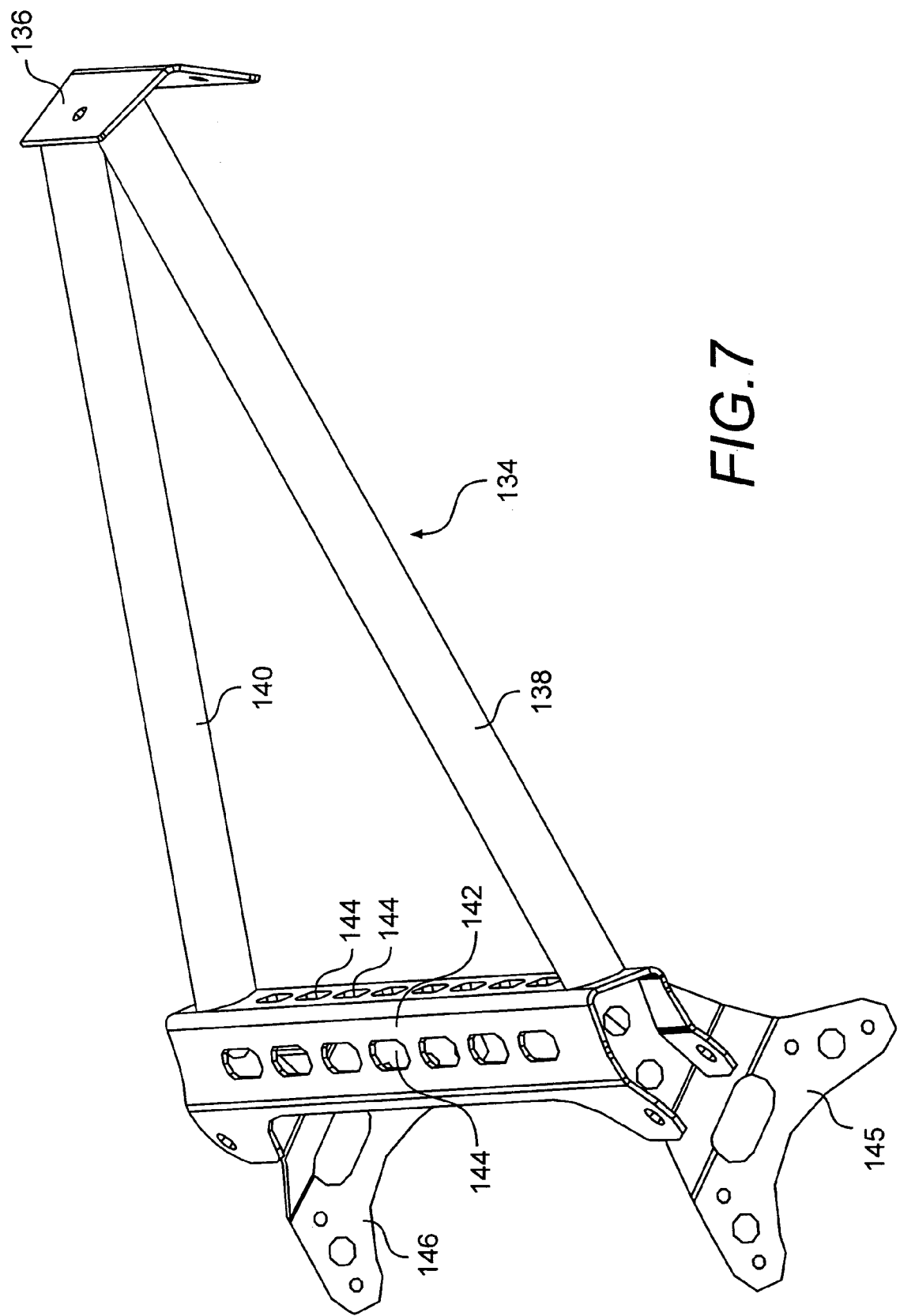
FIG. 7 is a perspective illustration of a forward support frame, which connects with the portion of the frame assembly depicted in FIG. 6.

FIG. 7 illustrates a forward support assembly 134 (also called front triangle 134), which connects to bracket 126 and extends forwardly of bracket 126. Forward support assembly 134 includes a bracket 136 at its rear end that connects to bracket 126 of frame assembly 84 (preferably bolted). Forward support assembly 134 also has left and right braces 138, 140 that extend forwardly and downwardly from bracket 136 and are connected thereto preferably by welding. Left and right braces 138, 140 are connected at their forward ends by a cross-member 142, which includes a plurality of holes 144 therein to lighten the weight thereof. Left and right connecting brackets 145, 146 are connected to cross-member 142. The left and right connecting brackets 145, 146 connect, in turn, to front suspension 110.

Figures 8, 9, 10:
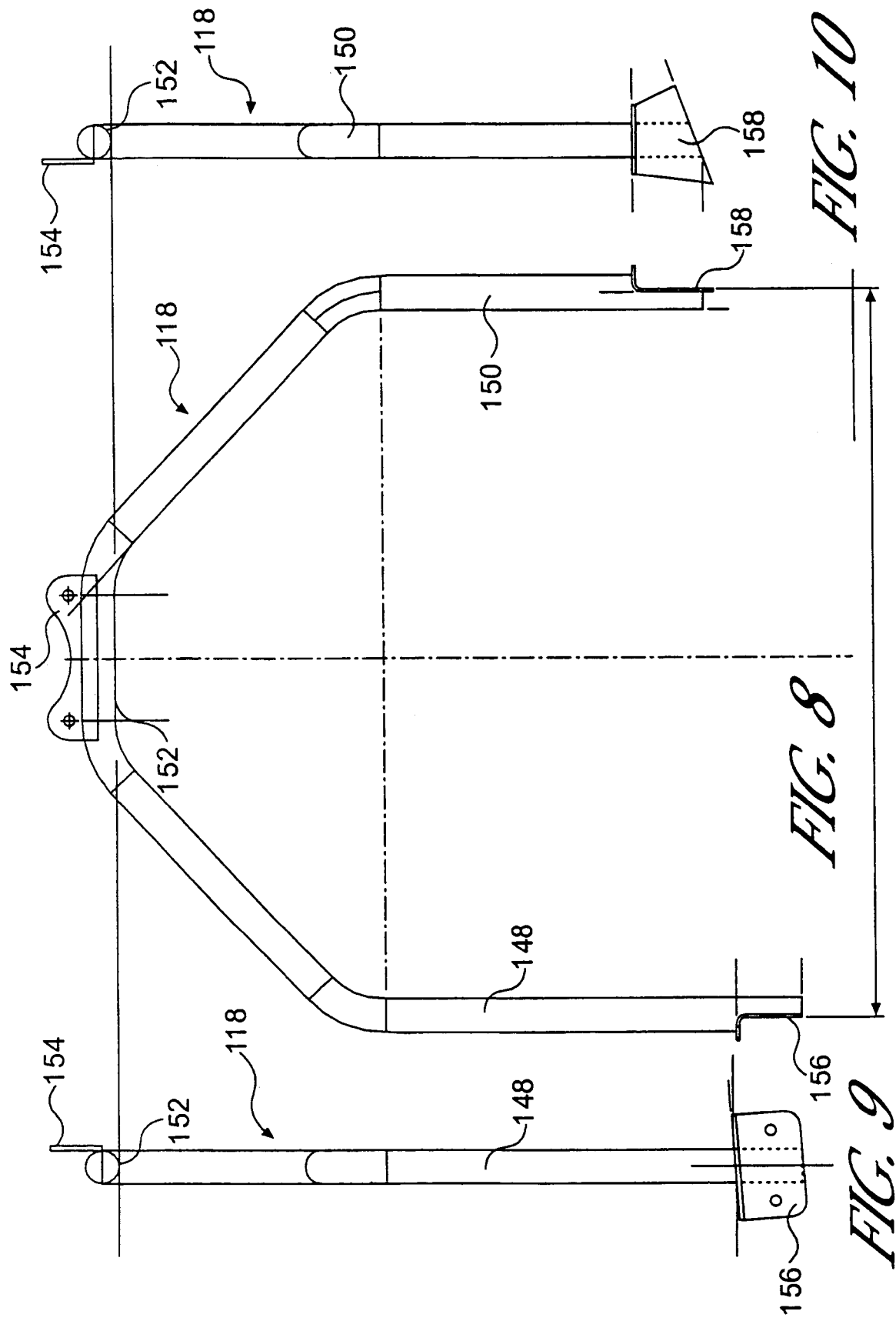
FIG. 8 is a front view illustration of an upper column of the frame assembly shown in FIG. 6.
FIG. 9 is a left side view illustration of the upper column depicted in FIG. 8.
FIG. 10 is a right side view illustration of the upper column shown in FIG. 8.

FIGS. 8, 9, and 10 illustrate upper column 118 in greater detail. As described above, upper column 118 is essentially an inverted U-shaped member that is preferably tubular in shape to facilitate its construction. Upper column 118 preferably is bent into the appropriate shape from a straight tube with the dimensions shown. As would be understood by those skilled in the art, however, upper column 118 need not be made as a tubular member.

Upper column 118 has left and right legs 148, 150 that extend downwardly from an apex 152. A bracket 154 is disposed at apex 152 for connection to bracket 126 of frame assembly 84. Preferably, bracket 154 is welded at the apex of upper column 118 (however any other suitable attachment means is possible). Left leg 148 includes a bracket 156 at its lower-most portion that connects left leg 148 to engine cradle 88. Similarly, right leg 150 includes a bracket 158 at its lower-most portion to connect right leg 150 to engine cradle 88. Preferably, brackets 156, 158 are welded to upper column 118. Left and right legs 148, 150 preferably attach to engine cradle 88 via bolts or other suitable fasteners.

Figure 11:
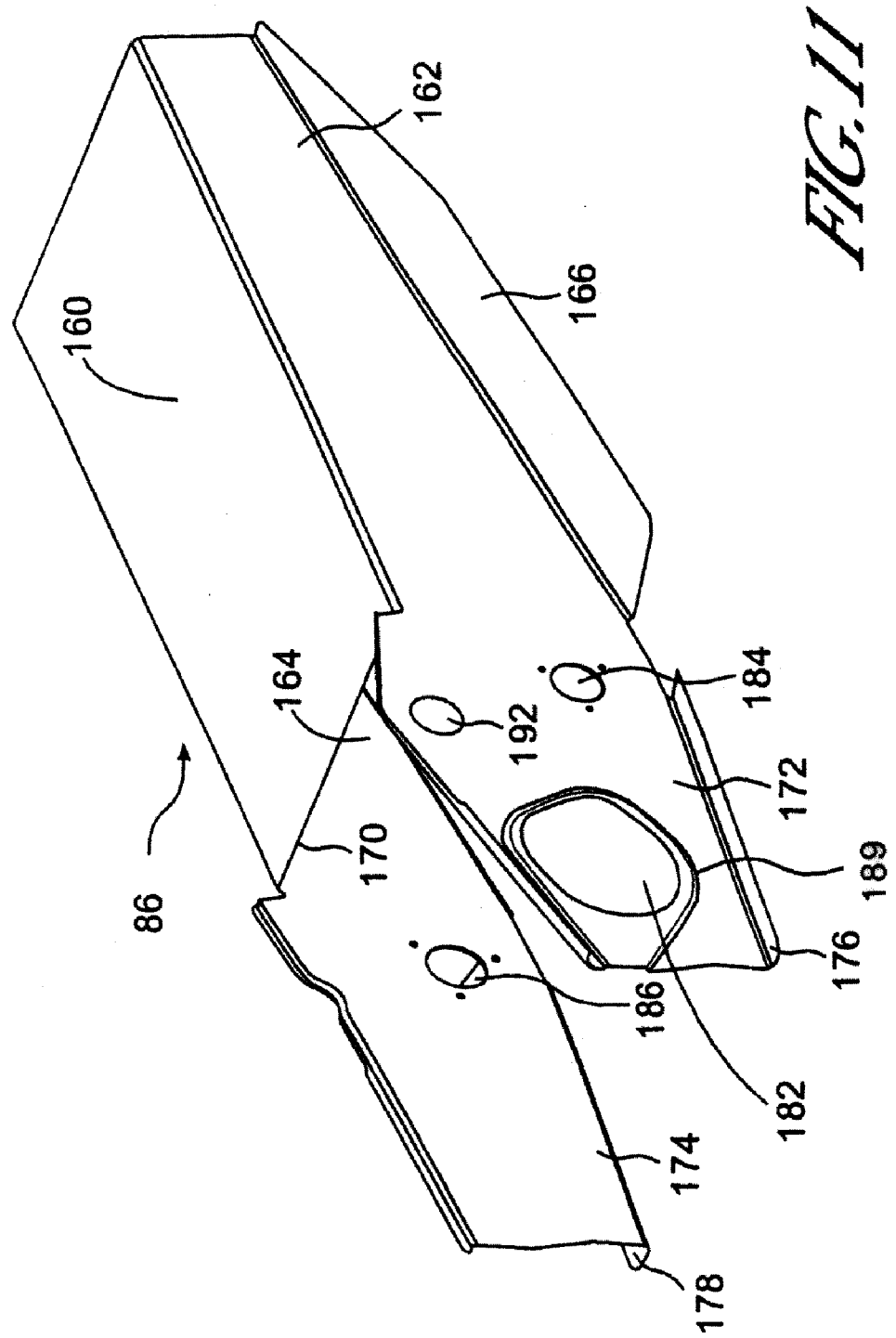
FIG. 11 is a perspective illustration, from the front left side, of a tunnel portion of the frame assembly of the present invention.
Figure 12:
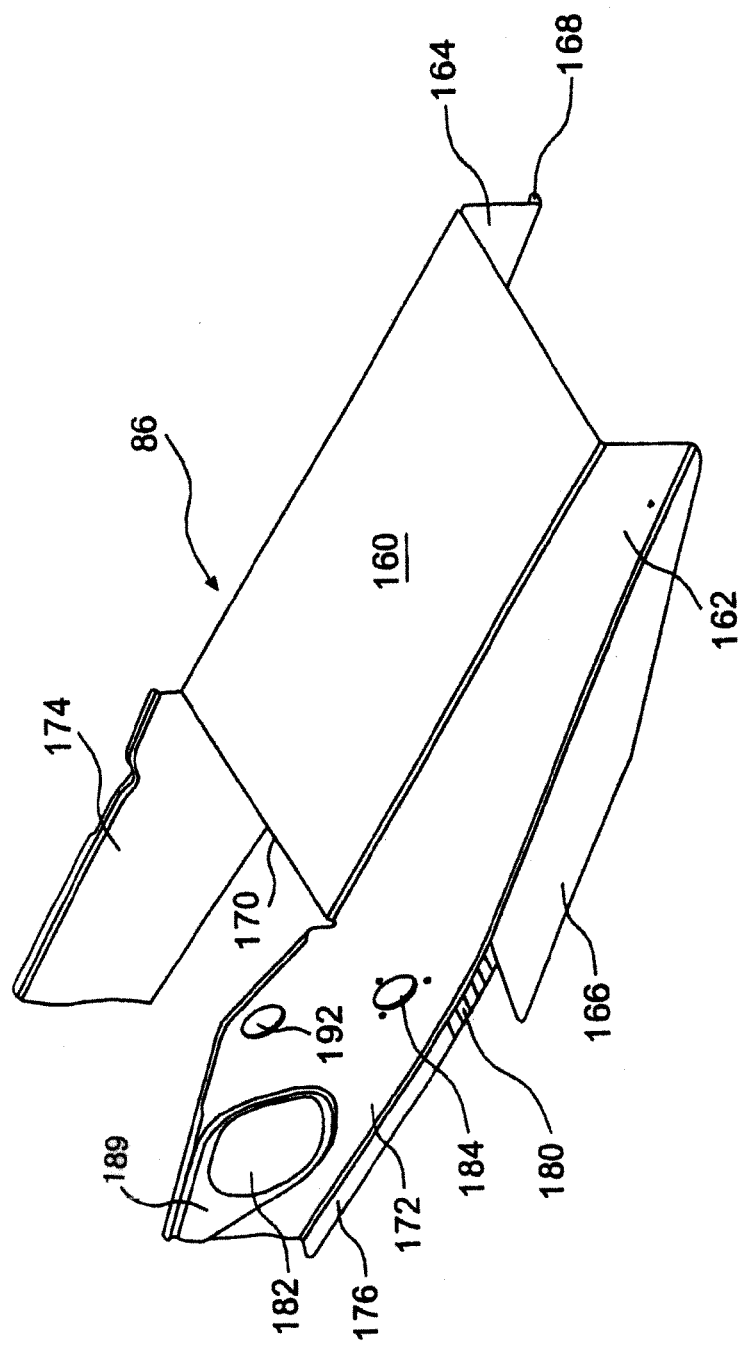
FIG. 12 is another perspective illustration, from the rear left side, of the tunnel portion of the present invention shown in FIG. 11.

FIGS. 11 and 12 illustrate tunnel 86 in greater detail. Tunnel 86 includes a top plate 160 with left and right downwardly extending side plates 162, 164. A left foot rest 166 extends outwardly from the bottom of left side plate 162. Similarly, a right foot rest 168 extends outwardly from the bottom portion of right side plate 164. Left and right foot rests 166, 168 provide a location along tunnel 86 onto which rider 24 may place his or her feet while operating snowmobile 22.

Left side plate 162 extends forwardly beyond the front portion 170 of tunnel 86 to form a left engine cradle wall 172. Similarly, right side plate 164 extends forwardly of front end 170 of tunnel 86 to form right engine cradle wall 174. At the lower edge of left and right engine cradle walls 172, 174, there are laterally extending portions 176, 178, which serve to strengthen left and right engine cradle walls 172, 174. Removable elements 180 extend between left foot rest 166 and left laterally extending portion 176. Removable portions 180 may or may not be removed between left foot rest 166 and left laterally extending portion 176. FIG. 11 shows removable portions 180 removed, while FIG. 12 shows removable portions 180 not removed. It should be noted that the same removable portions 180 may or may not extend between right foot rest 168 and right laterally extending portion 178.

Left engine cradle wall 172 preferably includes an opening 182 therethrough. Opening 182 permits the shafts from transmission 106 to pass therethrough. Unlike left engine cradle wall 172, right engine cradle wall 174 does not include such an opening. Instead, right engine cradle wall 174 is essentially solid. Due to its construction, right engine cradle wall 174 reflects radiant heat from engine 104 back to engine 104 to assist in minimizing heat dissipation from engine 104. Left and right openings 184, 186 are provided through left and right engine cradle walls 172, 174 so that a drive shaft 188 may pass therethrough. Drive shaft 186 connects to endless track 102 for propulsion of snowmobile 22. Opening 182 may include a member 189 about its periphery, also as illustrated in FIGS. 11 and 12, that provides clearance for the engine. Left engine cradle wall 172 also includes an opening 192 above opening 184 through which a shaft passes for part of transmission 106.

Figure 13:
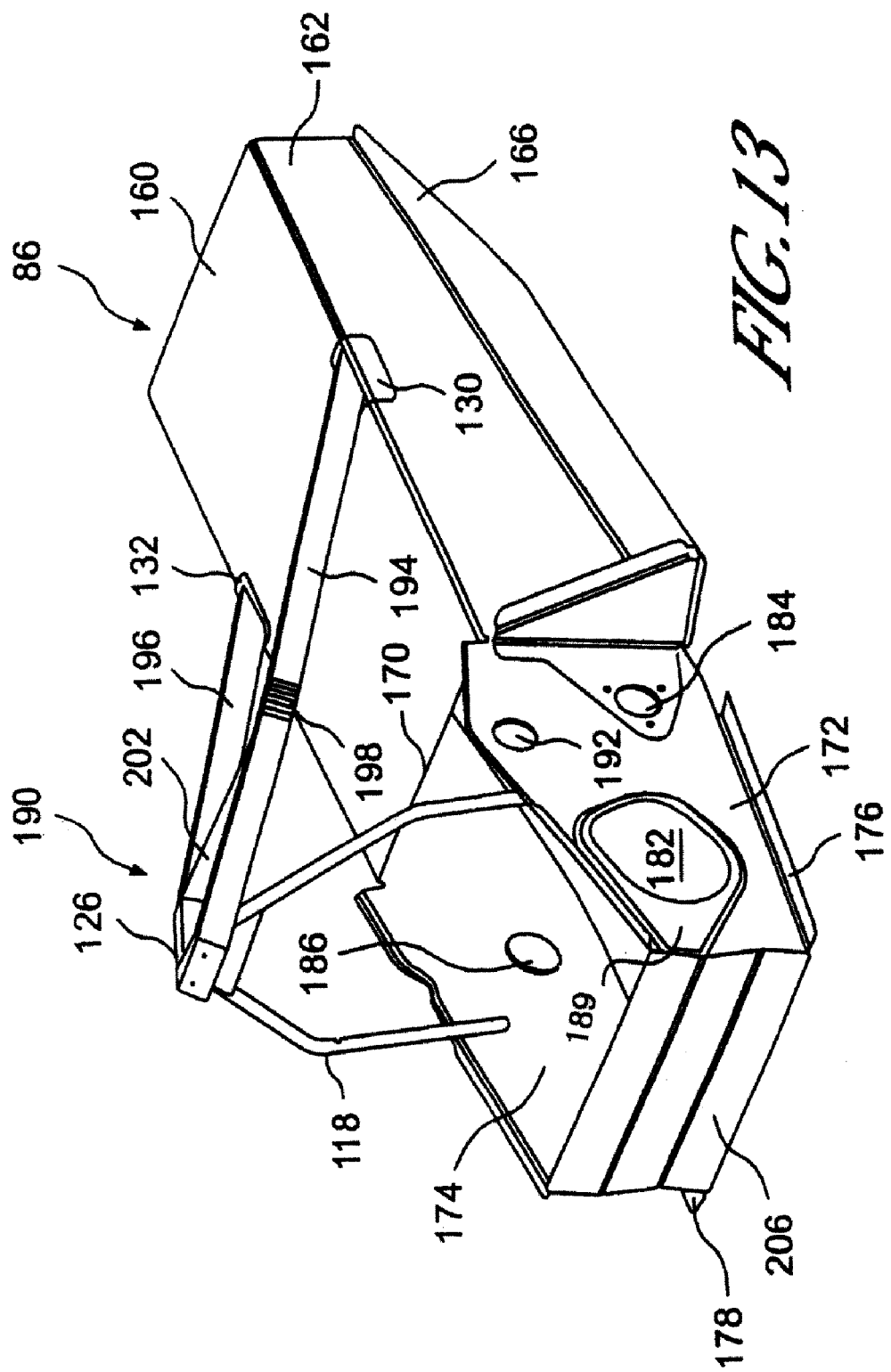
FIG. 13 is a perspective illustration, from the front left side, showing the combination of the frame assembly depicted in FIG. 6 connected to the tunnel portion depicted in FIGS. 11 and 12.
Figure 14:
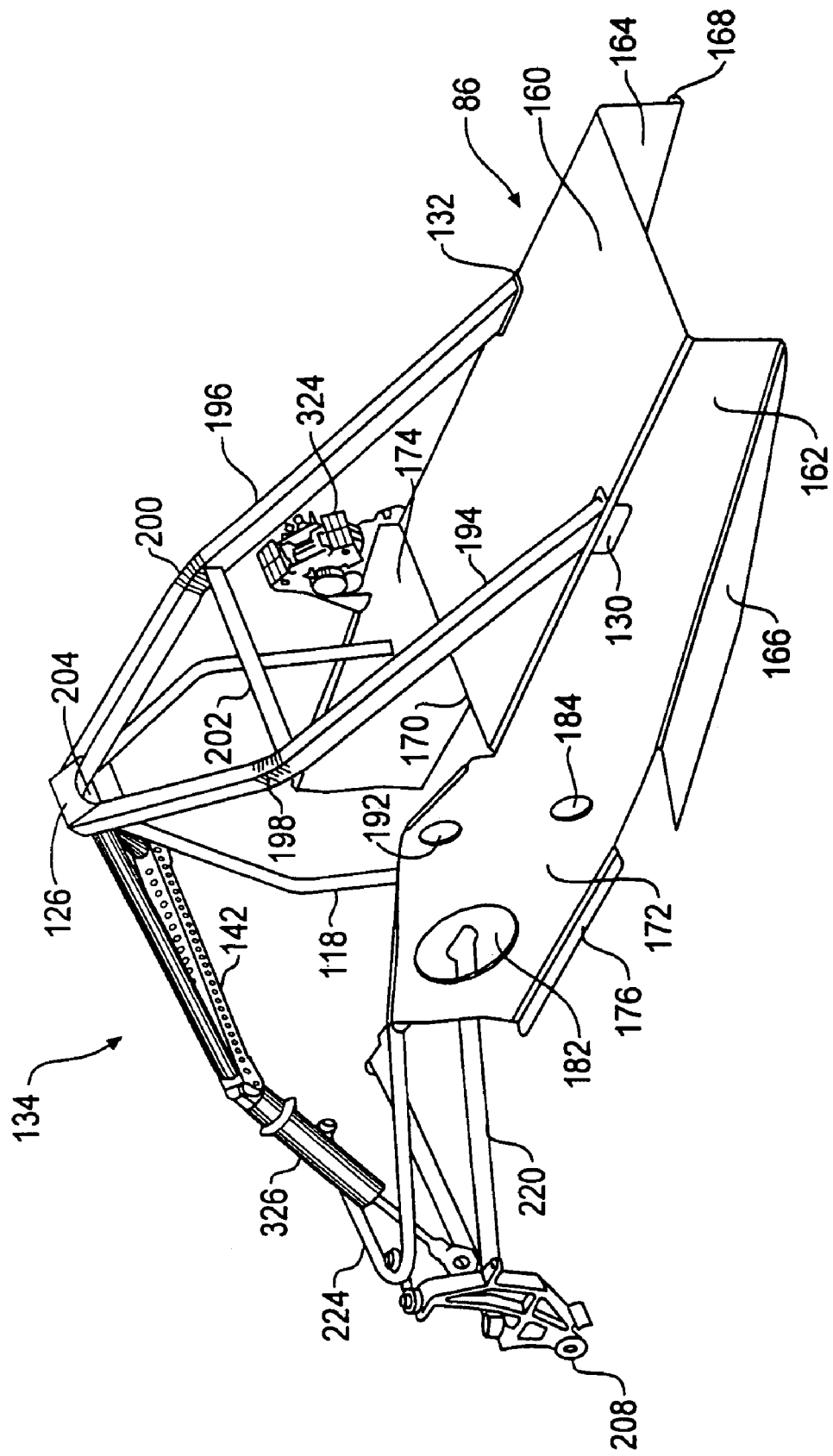
FIG. 14 is a perspective illustration, from the rear left side, showing the combination of the frame assembly depicted in FIG. 6 connected to the tunnel portion depicted in FIGS. 11 and 12 and also showing a portion of a front suspension assembly.

FIGS. 13 and 14 illustrate a combination of a variation of frame assembly 190 connected to tunnel 86. Frame assembly 190 includes upper column 118 as illustrated in FIGS. 8–10. However, frame assembly 190 differs somewhat from frame assembly 84. For example, left and right braces 194, 196 are shaped so that they extend outwardly from the positions defined by left and right braces 122, 124. As illustrated, left and right braces 194, 196 include elbows 198, 200. A cross-brace 202 optionally may be placed between left and right braces 194, 196 to add structural rigidity to frame assembly 190. As with frame assembly 84, a bracket 126 is provided at apex 204 where left and right braces 194, 196 meet one another. Forward support assembly 134 is the same as depicted in FIG. 7. A front engine cradle wall 206 is also shown in FIG. 13.

Figure 15:
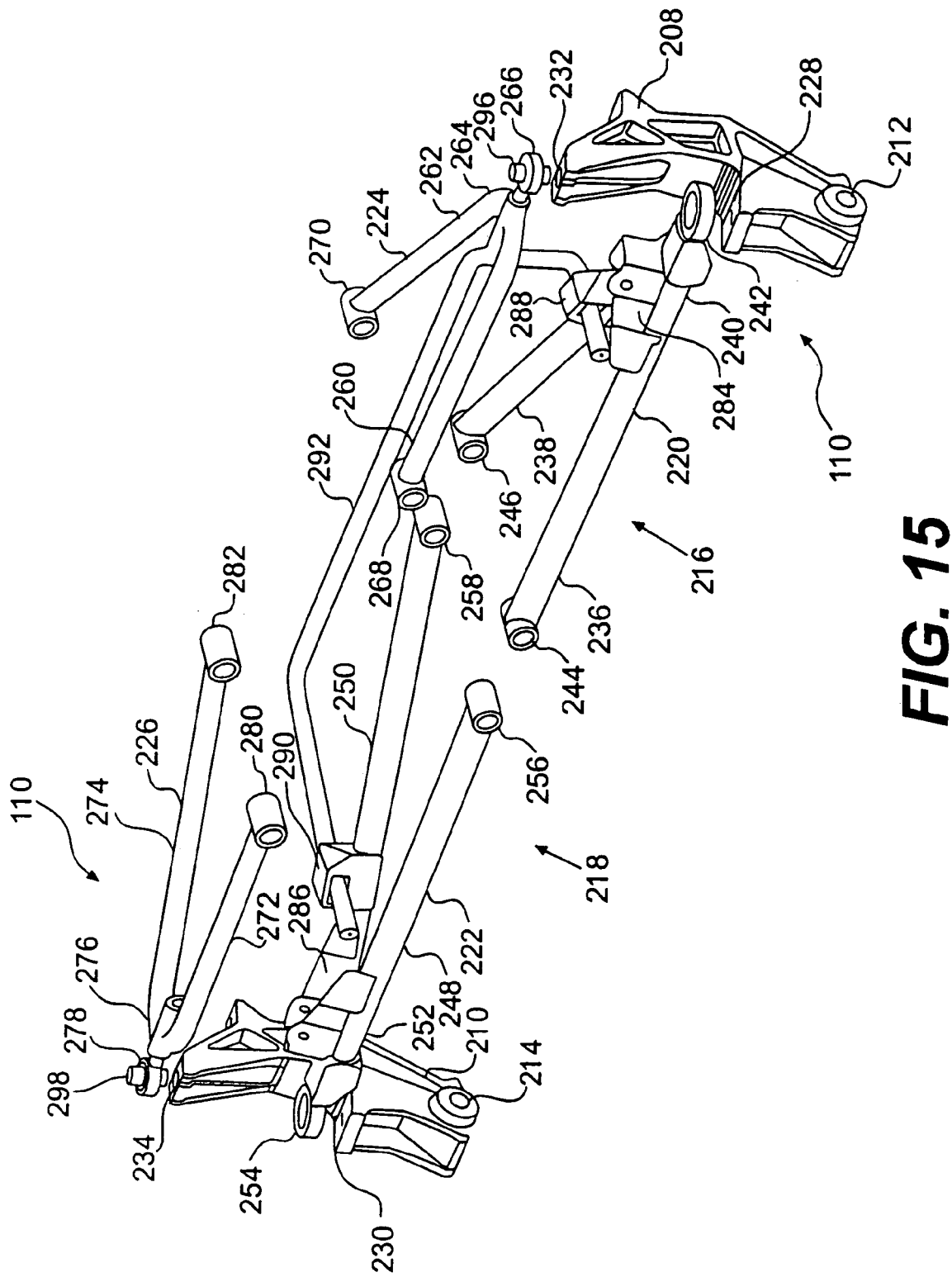
FIG. 15 is a perspective illustration, from the front left side, of some of the components that are part of the front suspension assembly depicted in FIG. 14.
Figure 16:
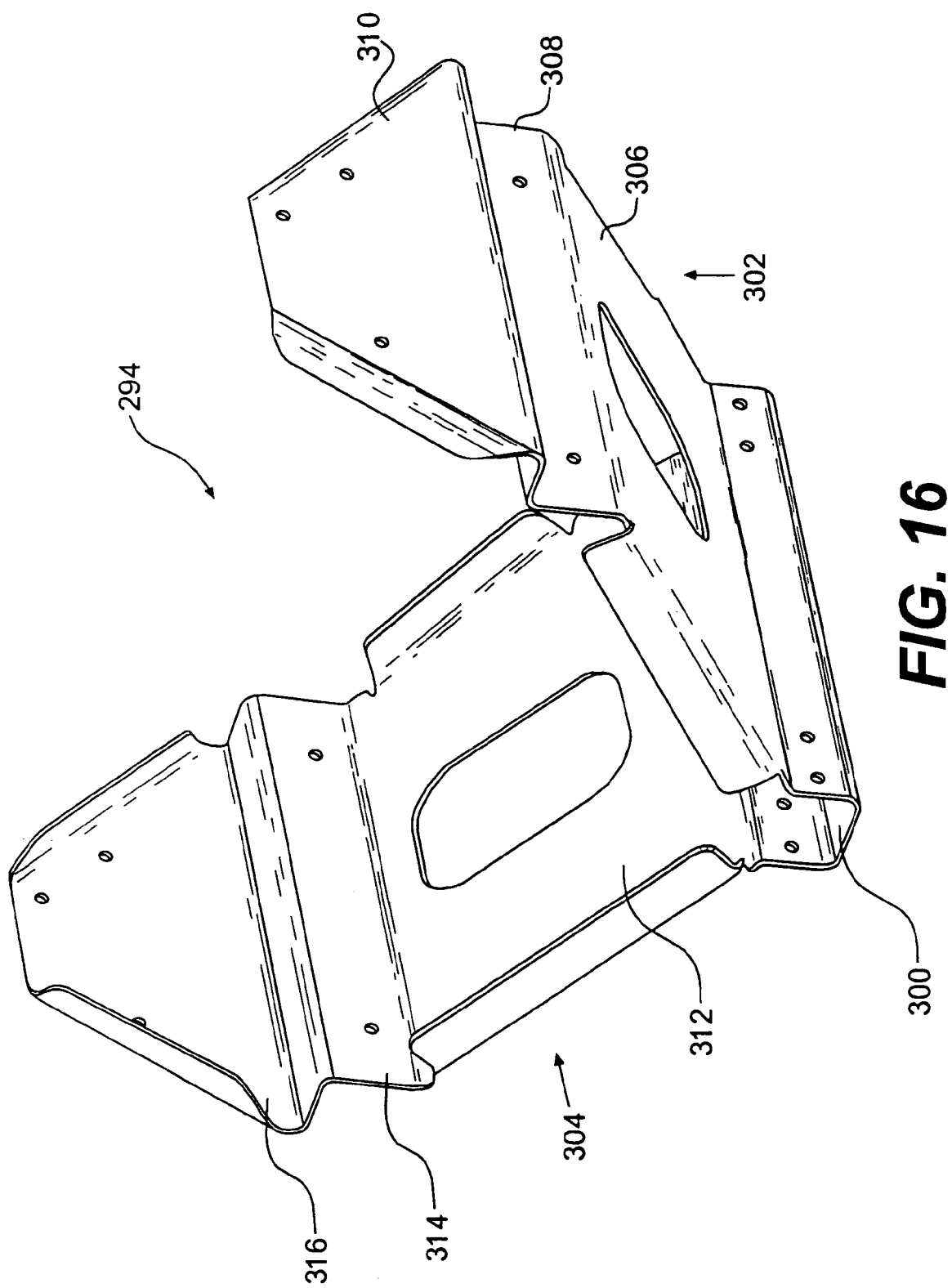
FIG. 16 is a perspective illustration, from the front left side, of a portion of a sub-frame that is part of the front suspension assembly illustrated in FIG. 15.
Figure 17:
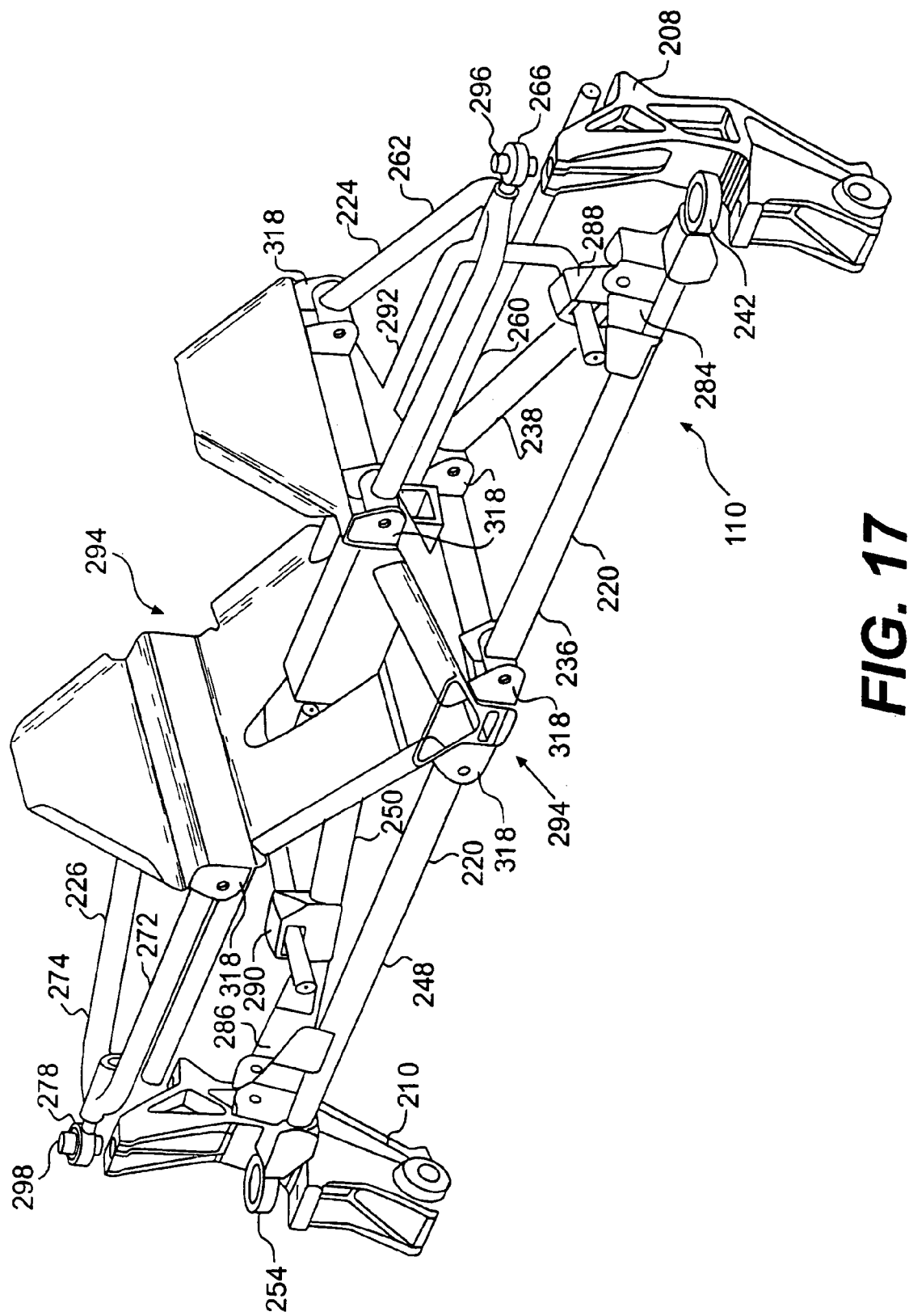
FIG. 17 is another perspective illustration, from the front left side, of the front suspension assembly for a snowmobile, constructed according to the teachings of the present invention, showing the positional relationship between the parts illustrated in FIG. 15 and the sub-frame illustrated in FIG. 16.

FIGS. 15–17 illustrate various aspects of front suspension 110 and associated structures. While the figures illustrate the embodiment preferably used in combination with snowmobile 22, it should be recognized that front suspension 110 may also be used in combination with a wheeled vehicle, as will be discussed in connection with FIGS. 23–27.

Front suspension 110 includes left and right ski legs 208, 210. Left and right ski legs 208, 210 are preferably made from aluminum and are preferably formed as extrusions. While an aluminum extrusion is preferred for left and right ski legs 208, 210, those skilled in the art would appreciate that ski legs could be made from any suitable material and in any acceptable manner that would provide similar strength and low weight characteristics. Left and right ski legs 208, 210 include holes 212, 214 through which a fastener (not shown) is disposed to pivotally connect skis 32 to snowmobile 22, as shown in FIG. 2.

Left and right ski legs 208, 210 are movably connected to left and right support arms 216, 218. Left and right suspension arms 216, 218 include lower left and right suspension support arms 220, 222 and upper left and right suspension support arms 224, 226.

As shown in FIGS. 15 and 17, lower left suspension support arm 220 connects to left ski leg at lower left attachment point 228 preferably through a ball joint (not shown) so that left ski leg 208 may pivot and rotate with respect to lower left suspension support arm 220. Similarly, lower right suspension support arm 222 connects to right ski leg 210 at lower right attachment point 230, preferably through a ball joint. Upper left suspension support arm 224 preferably attaches to left ski leg 208 at upper left attachment point 232, preferably through a ball joint or other suitable means. In addition, upper right suspension support arm 226 connects to right ski leg 210 at upper right attachment point 234 through a ball joint or other suitable means.

Lower left suspension support arm 220 includes front and rear members 236, 238, which meet at apex 240 where they connect with left lower eyelet 242. Front member 236 includes a joint 244 at an inner end, and rear member 238 includes a joint 246 also at an inner end. Similarly, lower right suspension support arm 222 includes front and rear members 248, 250, which meet at apex 252 where they connect with right lower eyelet 254. Front member 248 includes a joint 256 at an inner end and rear member 250 includes a joint 258 also at an inner end.

Upper left suspension support arm 224 includes front and rear members 260, 262, which meet at apex 264 where they connect with upper left eyelet 266. Front member 260 includes a joint 268 at an inner end, and rear member 262 includes a joint 270 also at an inner end. Similarly, upper right suspension support arm 226 includes front and rear members 272, 274, which meet at apex 276 where they connect with upper right eyelet 278. Front member 272 includes a joint 280 at an inner end and rear member 274 includes a joint 282 also at an inner end.

At a point inward from apex 240, lower left suspension support arm 220 includes a left bracket 284 that is connected to and extends partially along front and rear members 236, 238. Similarly, lower right suspension support arm 222 includes a right bracket 286 that is connected to and extends partially along front and rear members 248, 250. Slidably attached to rear member 238 of lower left suspension arm 220 is a left pivot block 288. A right pivot block 290 is slidably attached to rear member 250 of lower right suspension support arm 222. A stabilizer bar 292 is connected between left and right pivot blocks 288, 290. Stabilizer bar 292 is adapted to slide and pivot by way of left and right pivot blocks 288, 290. These blocks 288, 290 slide relative to left and right lower suspension support arms 220, 222. Left and right bushings 296, 298 are provided to allow some rotation of the components of front suspension 110. Left and right ski legs 208, 210 rotatably connect to front suspension 110 for facilitating movement of skis 32.

FIG. 16 illustrates sub-frame 294, which is essentially a unitary, V-shaped structure. Sub-frame 294, which forms a part of front suspension 110, includes a central channel 300 flanked on either side by left and right upwardly extending panels 302, 304. Left upwardly extending panel 302 includes a left lower panel 306 connected to left transition structure 308 and left triangular panel 310. Similarly, right upwardly extending panel 304 includes a right lower panel 312 connected to right transition structure 314 and right triangular panel 316. While sub-frame 294 preferably is a unitary structure (an integrally-formed structure), sub-frame 294 need not be constructed in this manner. As would be understood by those skilled in the art, sub-frame 294 may be assembled from a number of separate elements that are connected together by any suitable means such as by welding or by fasteners.

As illustrated in FIG. 17, sub-frame 294 is an integral part of front suspension 110 and connects to left support arm 216 and right support arm 218 through a number of brackets 318 connected at various locations on sub-frame 294.

Figure 18:
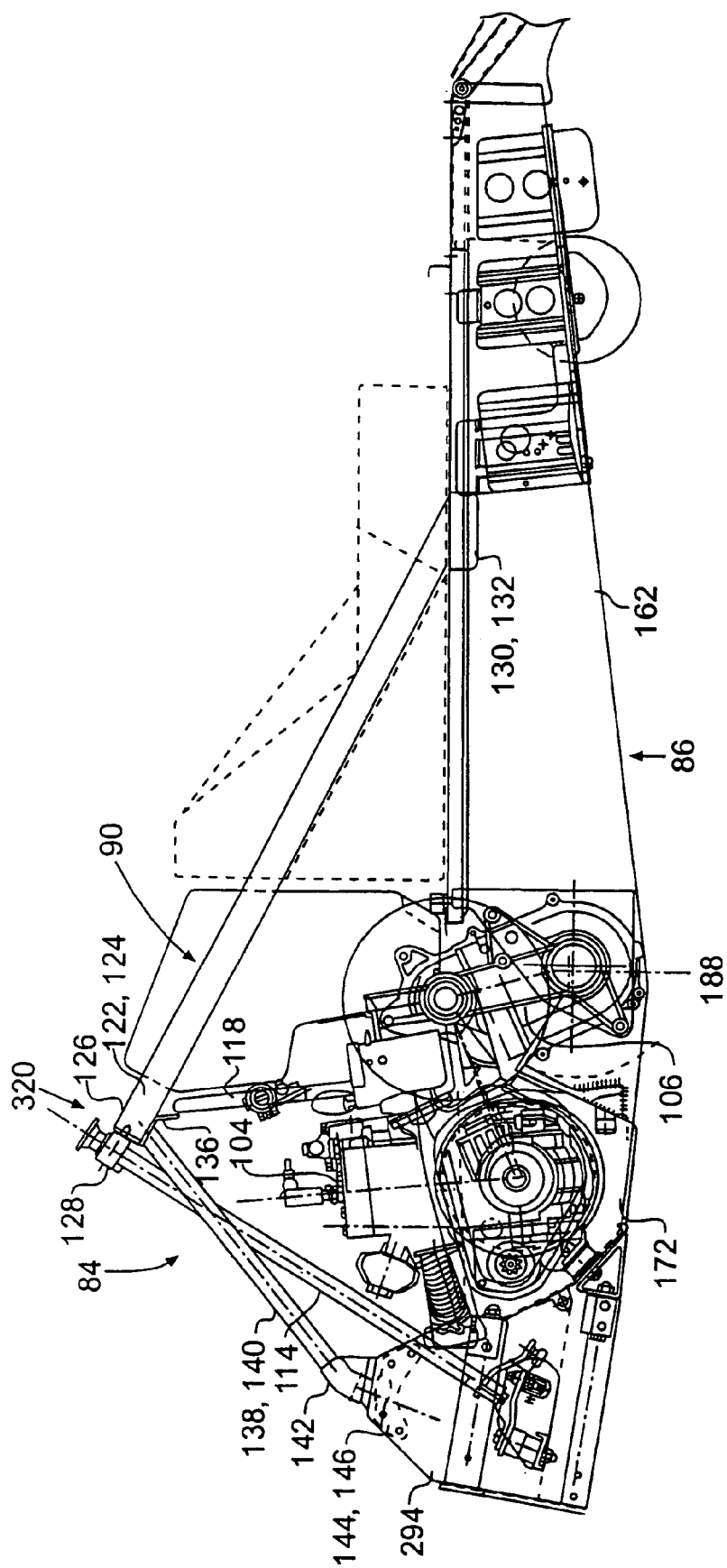
FIG. 18 is a side view schematic of the frame assembly of the present invention showing the positional relationship between the frame assembly and the engine, among other components.

FIG. 18 is a side view of one embodiment of the completed frame assembly 84 of the present invention. As shown, over-arching frame elements 90 are connected between tunnel 86 and sub-frame 294 to establish an apex 320 to which steering shaft 114 is connected.

Figure 19:
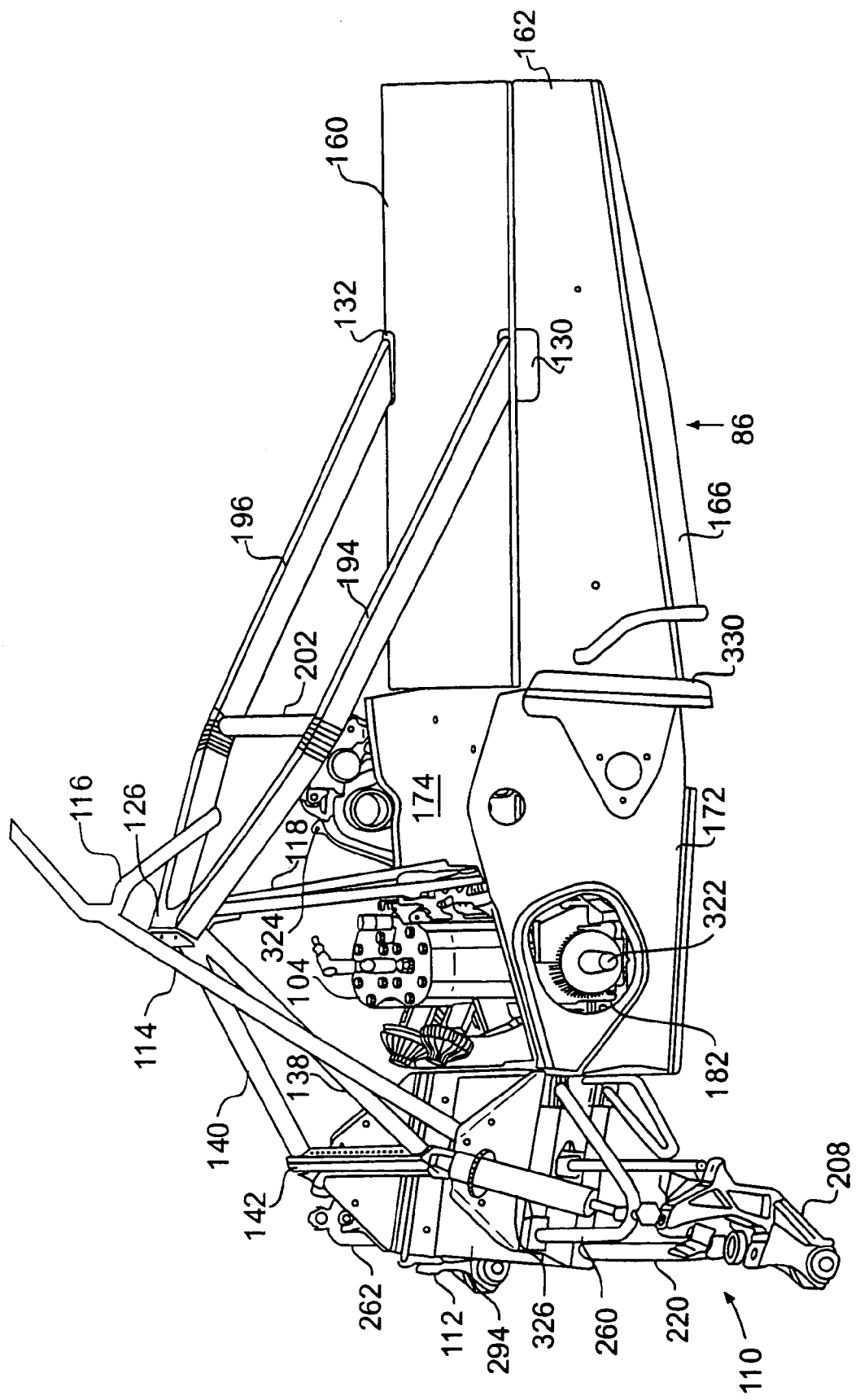
FIG. 19 is a perspective illustration, from the left side, of the frame assembly according to the teachings of the present invention, also showing the positional relationship between the frame assembly, the engine, and the front suspension.

FIG. 19 is a perspective illustration of the embodiment of the present invention shown in FIGS. 13 and 14 to assist in understanding the scope and content of the present invention. As illustrated, drive shaft 322 extends through left opening 182 in left engine cradle wall 172. A portion of gearbox 324 is also visible. In addition, left shock absorber 326, which is connected between cross-member 142 and left support arm 216, is illustrated. Right shock absorber, which extends between cross-member 142 and right support arm 218 is visible in FIG. 20. Furthermore, left forward foot wall 330 is shown at the forward end of left foot rest 166. A similar forward foot wall may be provided on the right side of snowmobile 22 (but is not illustrated herein).

Figure 20:
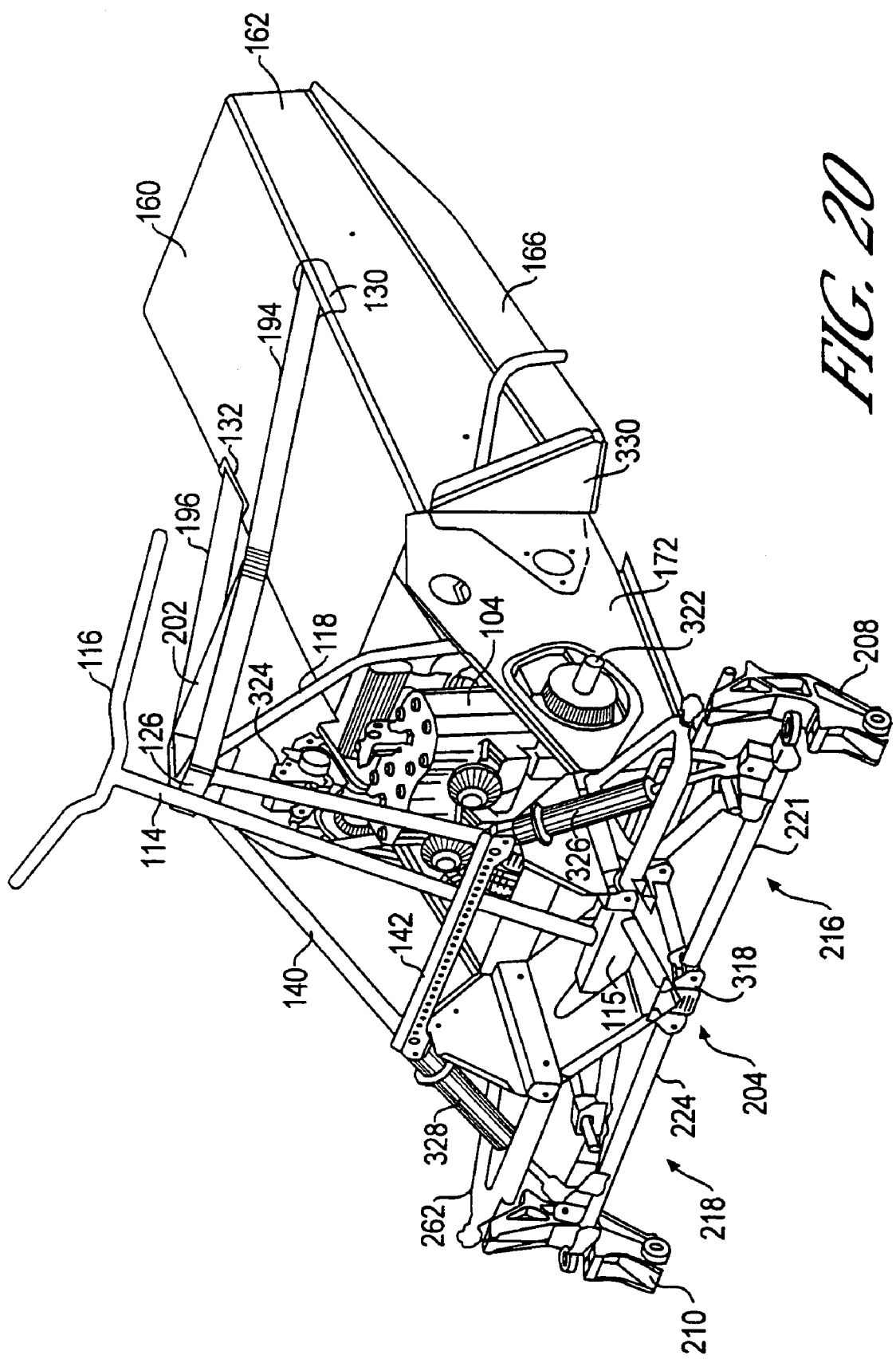
FIG. 20 is another perspective illustration, from the front left side, of the combined frame assembly and tunnel portion constructed according to the teachings of the present invention, also showing the positional relationship between the frame assembly, the engine, and the front suspension.
Figure 21:
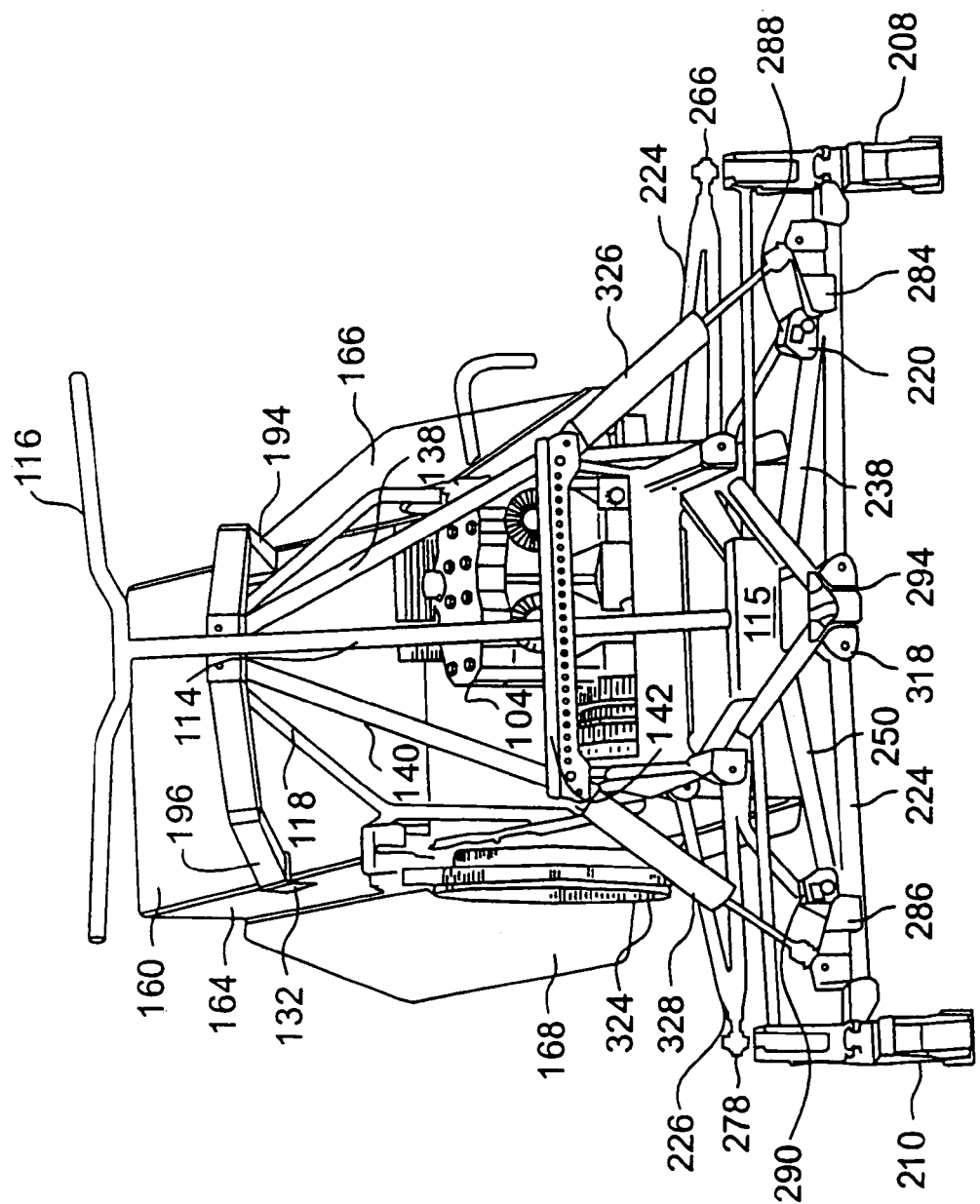
FIG. 21 is a front perspective illustration of the embodiment depicted in FIG. 20.
Figure 22:
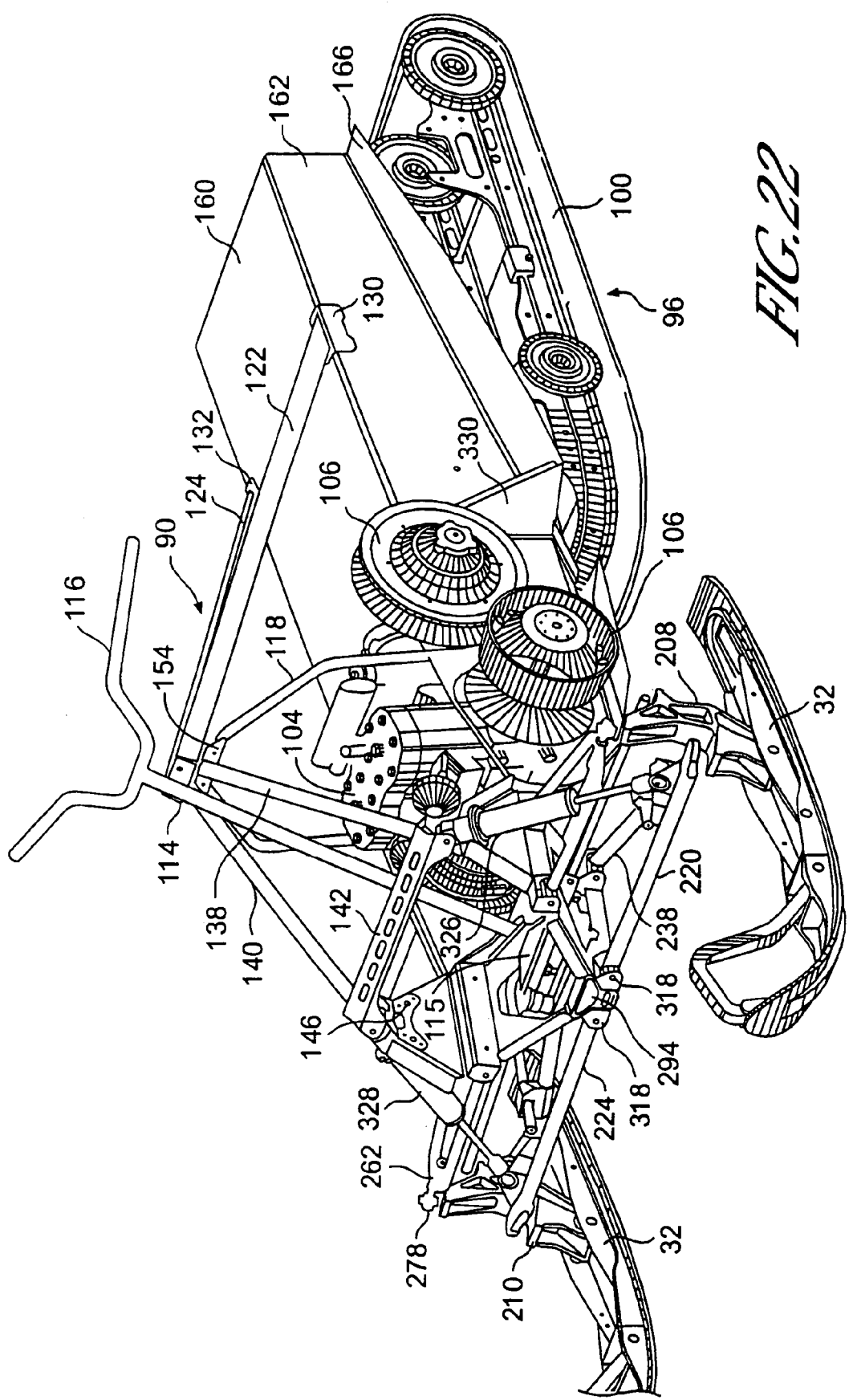
FIG. 22 is a perspective illustration of a slightly different embodiment from the one depicted in FIG. 20.

FIGS. 20 and 21 illustrate further details of the present invention by showing the various elements from slightly different perspective views. FIG. 22 illustrates the modified version of the elements of the present invention shown in FIGS. 6 and 7. Here, left and right braces 122, 124 are illustrated instead of left and right braces 194, 196. As discussed previously, left and right braces 122, 124 differ from left and right braces 194, 196 in that they are not bent but, instead, are straight elements of overarching frame 90. The same left and right braces 122, 124 are shown in FIG. 18. As would be understood by those skilled in the art, the two different embodiments of these braces are interchangeable. In addition, their shape may be altered depending on the requirements of the particular vehicle design, as would be understood by those skilled in the art.

Left and right braces 194, 196 are bent to accommodate an airbox (not shown) between them. Left and right braces 122, 124 are not bent because they do not need to accommodate an airbox.

FIG. 20 also illustrates steering gear box 115 at the bottom end of steering shaft 114 that translates the movement of handlebars 116 into a steering motion of skis 32.

FIGS. 23–27 illustrate alternate embodiments of the present invention that are designed for a wheeled vehicle 332, rather than a snowmobile 22. For the most part, the elements designed for wheeled vehicle 332 are the same as those for snowmobile 22, except for those elements required to attach wheels 334 to wheeled vehicle 332.

In the preferred embodiment of wheeled vehicle 332, the vehicle includes two front wheels 334 and a single rear wheel 336. As would be understood by those skilled in the art, however, wheeled vehicle 332 may be constructed with two rear wheels rather than one. If so, wheeled vehicle 332 would be a four-wheeled vehicle rather than the three-wheeled vehicle shown.

Wheeled vehicle 332 includes a seat 338 disposed over tunnel 86 in the same manner as snowmobile 22. The vehicle includes engine 104 at its forward end, encased by fairings 340. Fairings 340 protect engine 104 and provide wheeled vehicle 332 with an aesthetically pleasing appearance.

Engine 104 is connected to CVT 106, which translates the power from engine 104 into motive power for wheeled vehicle 332.

Figure 23:
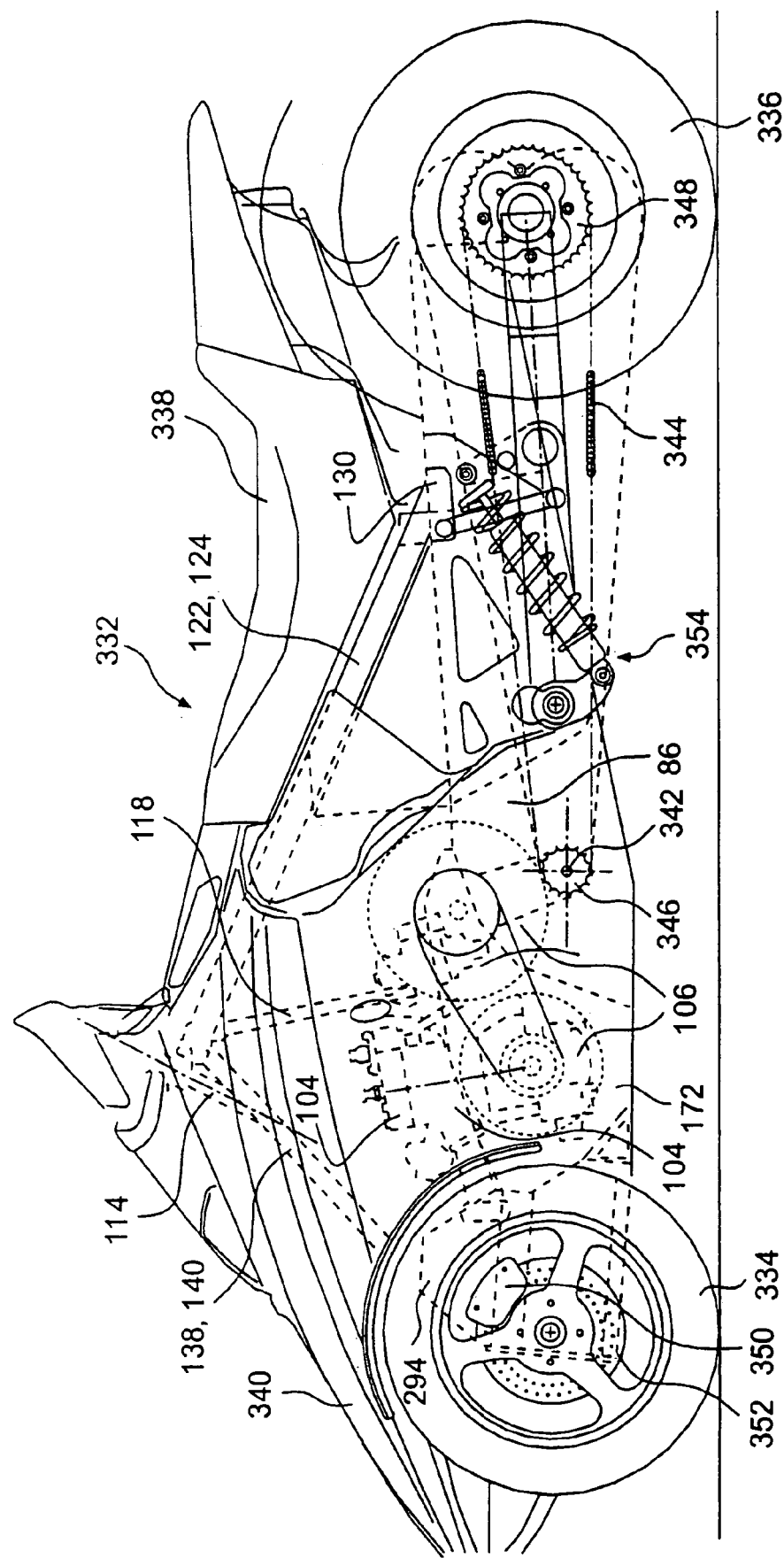
FIG. 23 is a schematic side view illustration of the frame assembly of the present invention as embodied in a wheeled vehicle.

As shown in FIG. 23, CVT 106 is connected by suitable means to drive shaft 342, which is connected to rear wheel 336 by a drive chain 344. A sprocket 346 is connected to drive shaft 342. A similar sprocket 348 is provided on the shaft connected to rear wheel 336. Drive chain 344 is an endless chain that connects sprockets 346, 348 to one another. To stop wheeled vehicle 332 during operation, disc brakes 350 are connected to front wheels 334. Disc brakes 350 clamp onto discs 352 to slow or stop wheeled vehicle 332 in a manner known to those skilled in the art.

A rear suspension 354 is provided under tunnel 86. Rear suspension 354 absorbs shocks associated with the terrain over which wheeled vehicle 332 travels. Rear suspension 354 replaces rear suspension 28 on snowmobile 22.

Figure 24:
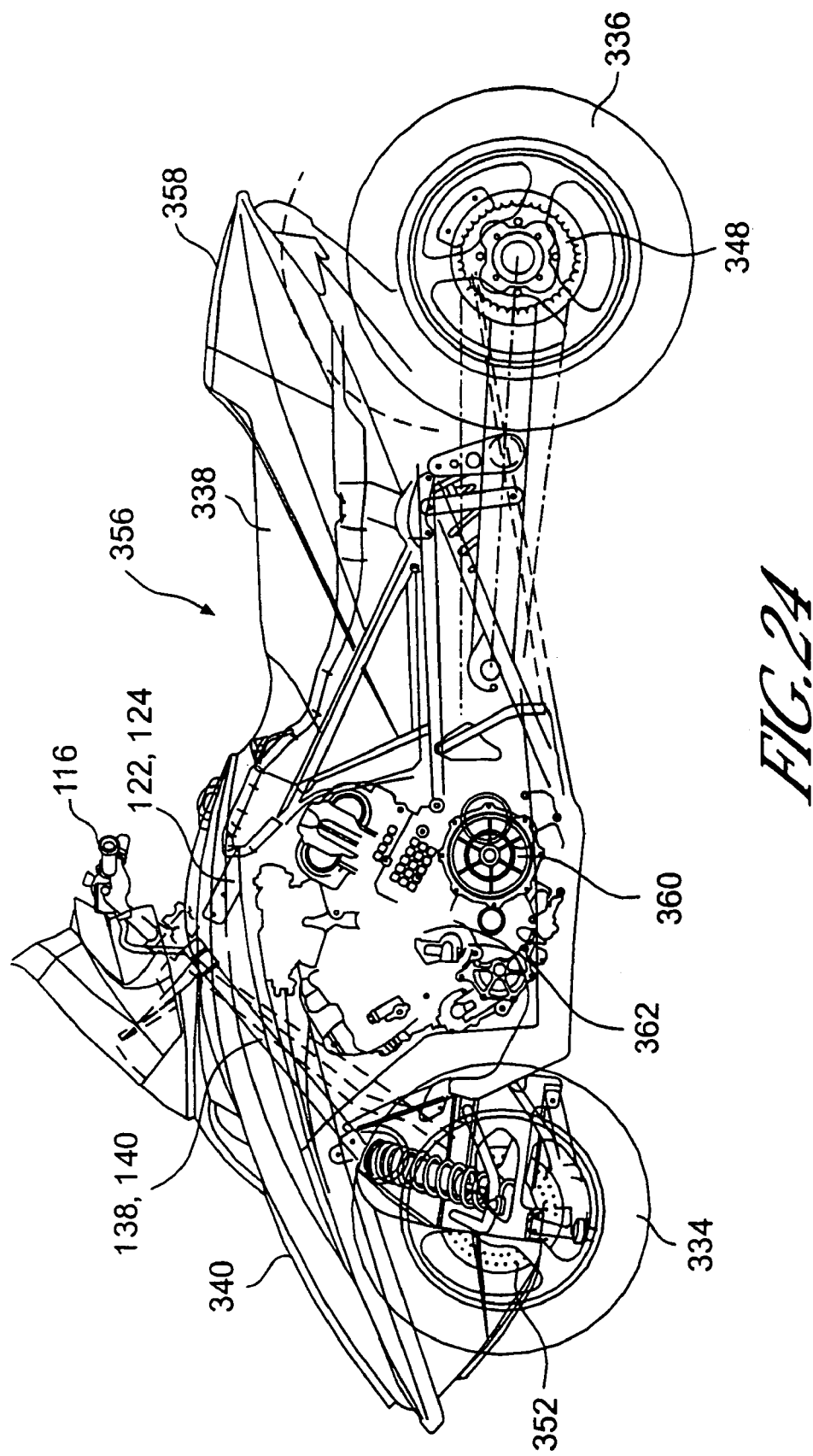
FIG. 24 is a schematic side view illustration of the frame assembly of the present invention as embodied in a slightly modified version of a wheeled vehicle.

FIG. 24 illustrates an alternate embodiment of wheeled vehicle 356. Wheeled vehicle 356 differs in its construction at the rear. Specifically, rear end 358 is shorter than that shown for wheeled vehicle 332. In addition, wheeled vehicle 356 includes a four stroke engine, rather than the two stroke engine 104 illustrated for wheeled vehicle 332. Also, wheeled vehicle 356 includes a manual speed transmission 360 (with a clutch) rather than continuously variable transmission 106, as illustrated with other embodiments of the present invention. Both constructions of the wheeled vehicle, as well as many other variations, are contemplated within the scope of the present invention. In addition, as discussed above, the present invention may be used with a two or four stroke engine (or any other type of engine that provides the motive power for the vehicle).

Figure 25:
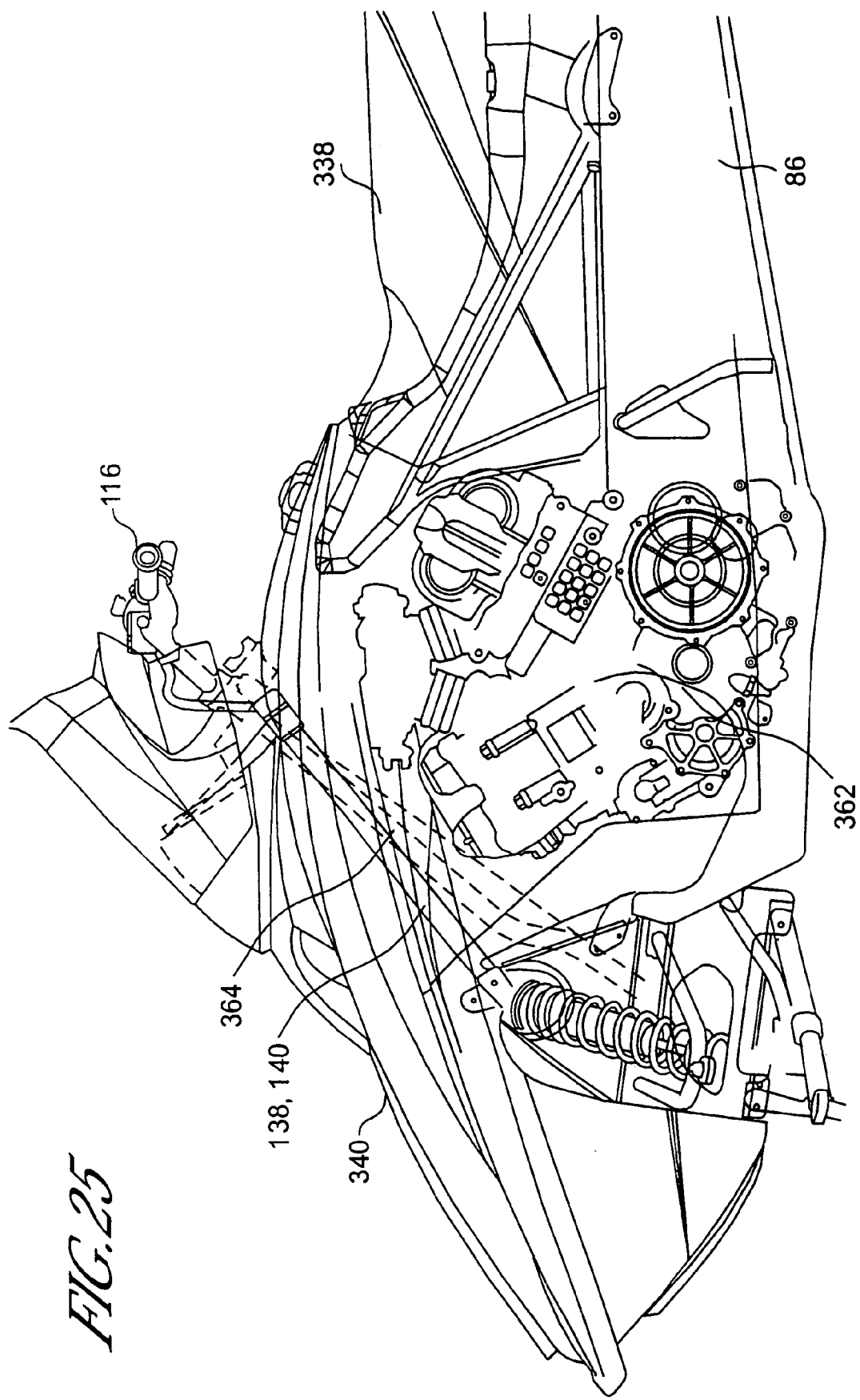
FIG. 25 is an enlarged side view illustration of the frame assembly of the present invention as embodied in the wheeled vehicle shown in FIG. 24.

FIG. 25 illustrates in greater detail the embodiment of the present invention shown in FIG. 24.

Figure 26:
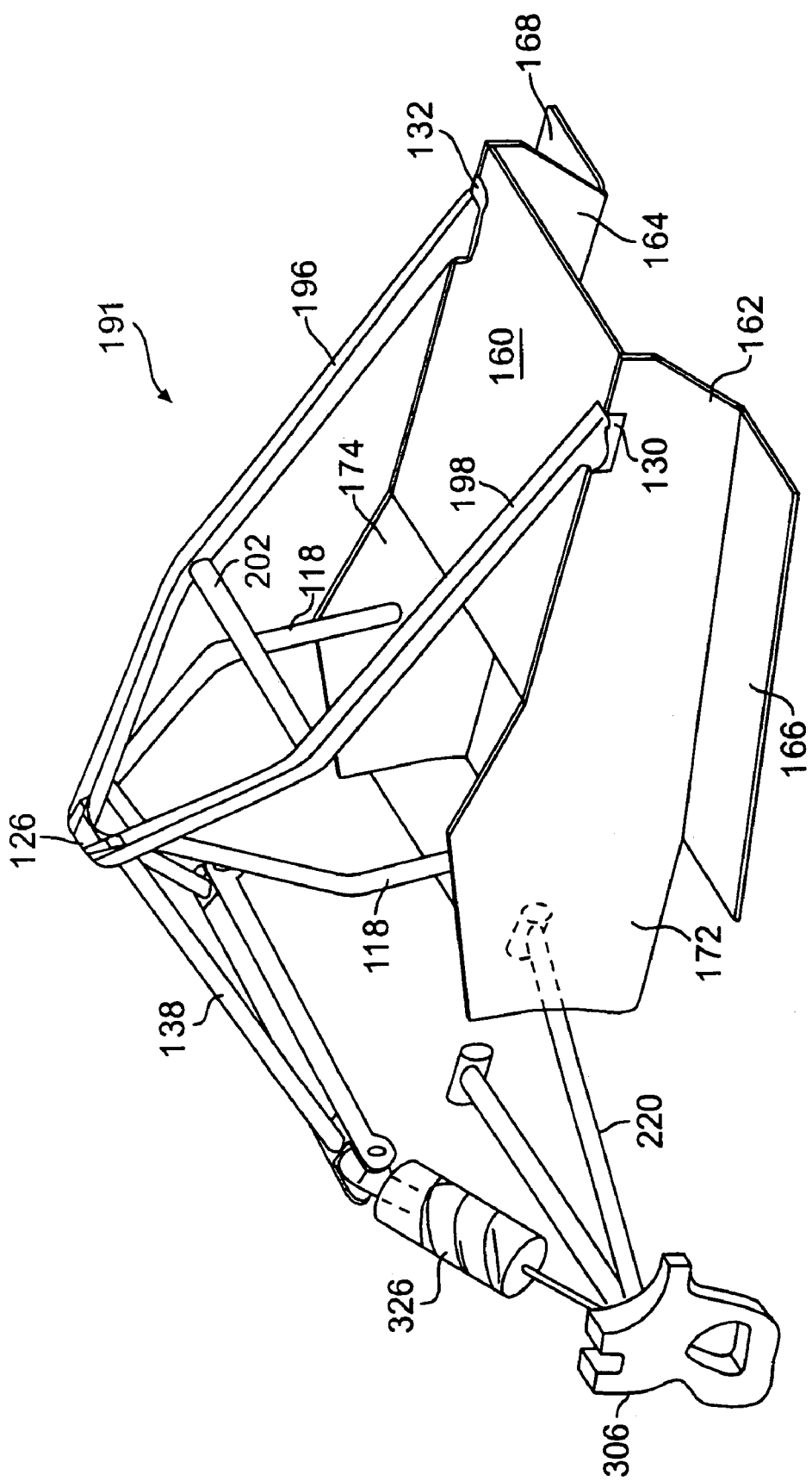
FIG. 26 is a perspective illustration, from the left rear, of the frame assembly of the present invention, showing some of the detail of the front suspension incorporated into the wheeled vehicle shown in FIGS. 23 and 24.
Figure 27:
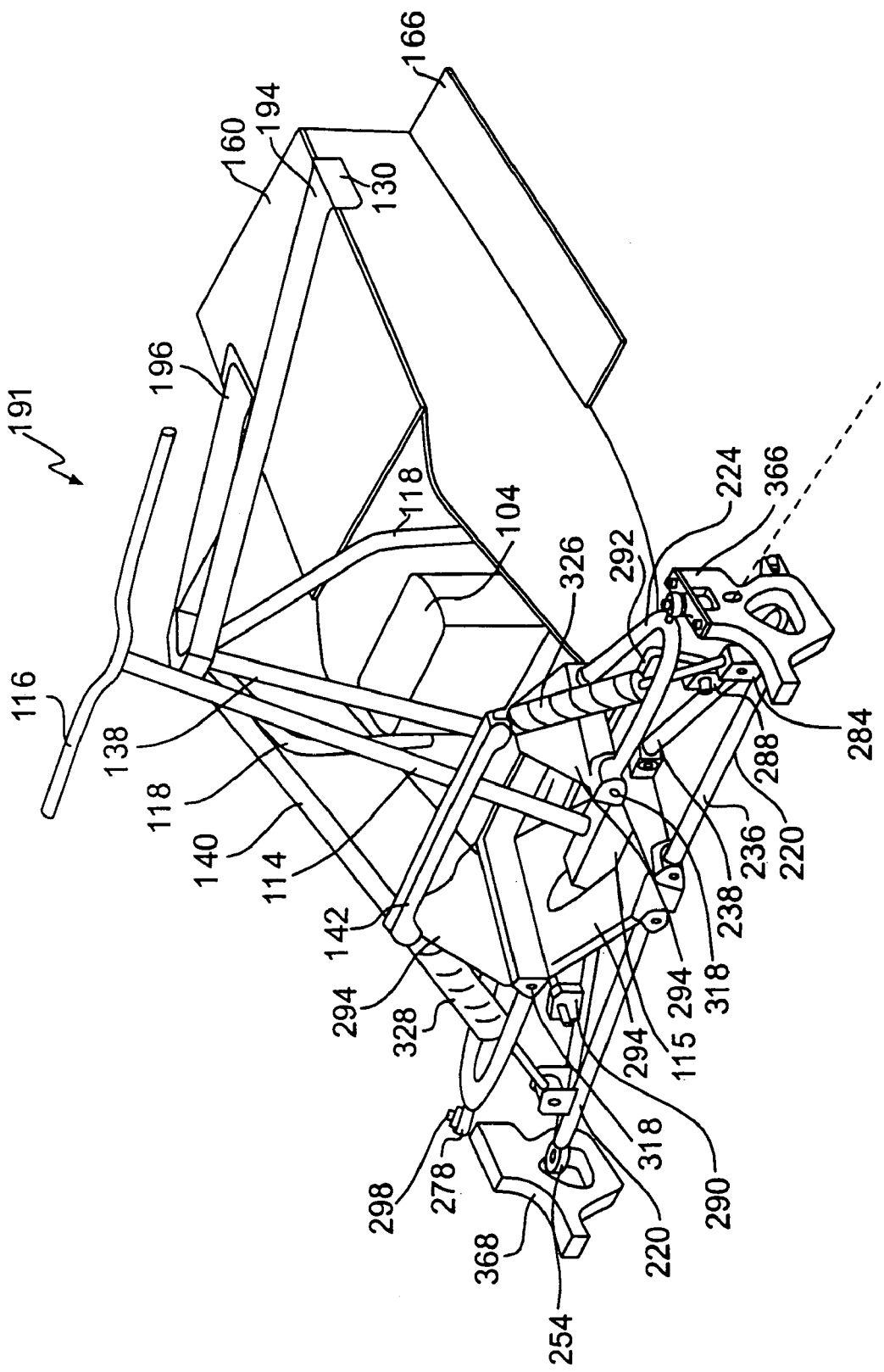
FIG. 27 is a perspective illustration, from the front left, showing the frame assembly of the present invention as depicted in FIG. 26.

FIGS. 26–27 illustrate the basic frame assembly contemplated for wheeled vehicles 332, 356. For either vehicle, the construction of frame assembly 191 is similar to that previously described. This embodiment differs in that left and right wheel knuckles 366, 368 are provided so that wheels 334 may be attached thereto. In most other respects, the construction of frame assembly 191 is the same as that previously described.

The variable geometry of steering shaft 364 will now be described in connection with FIGS. 28–34.

Figure 28:
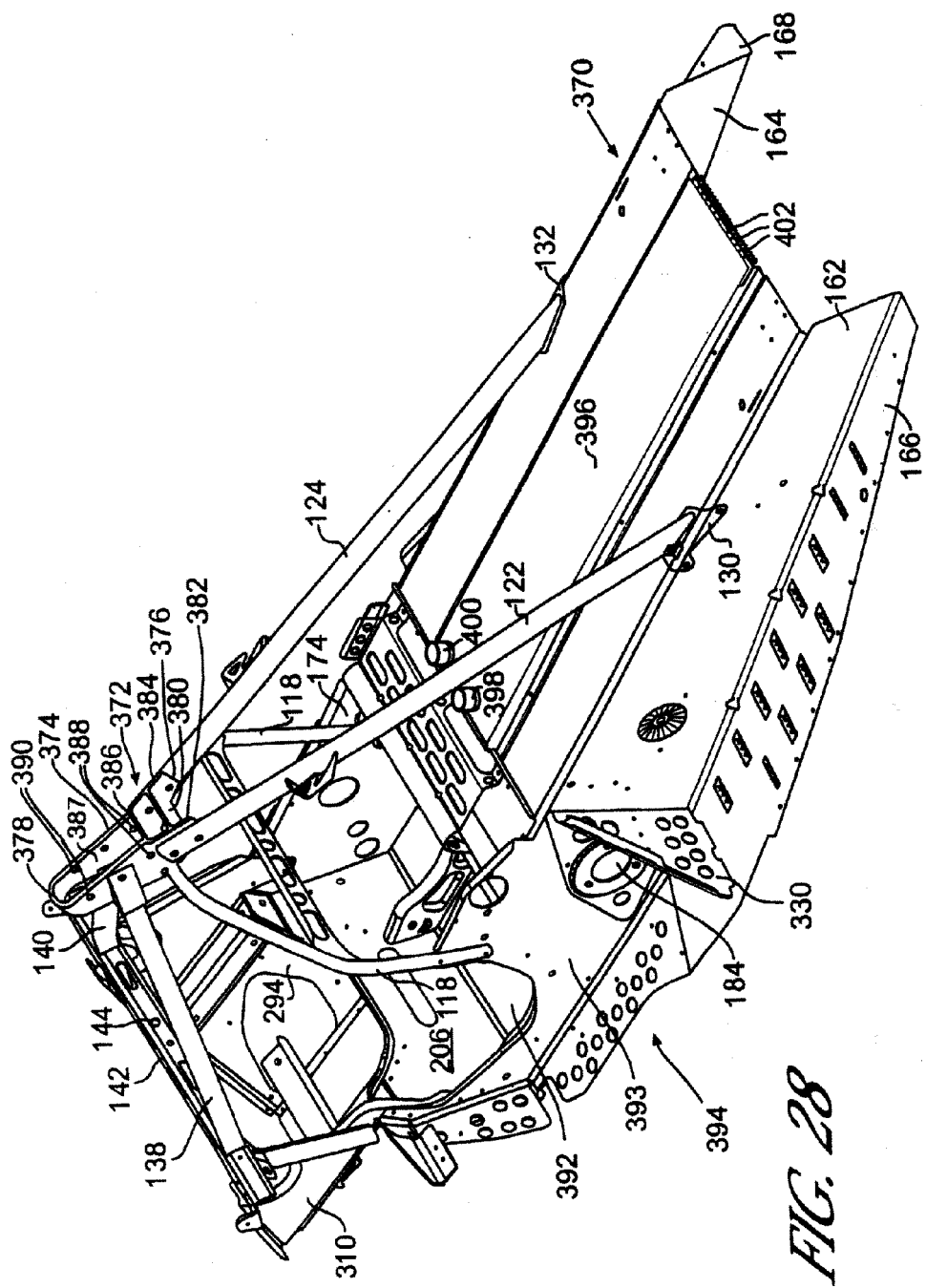
FIG. 28 is a perspective illustration, from the rear left side of an alternate embodiment of the frame assembly of the present invention.

As illustrated in FIG. 28, left brace 122 and right brace 124 extend upwardly from tunnel 370 to apex 372 where they connect to variable geometry steering bracket 374. Upper column 118 extends from left engine cradle wall 393 and right engine cradle wall 174 and also connects to variable geometry steering bracket 374. Forward support assembly 134 extends from sub-frame 294 to variable geometry steering bracket 374.

Figure 29:
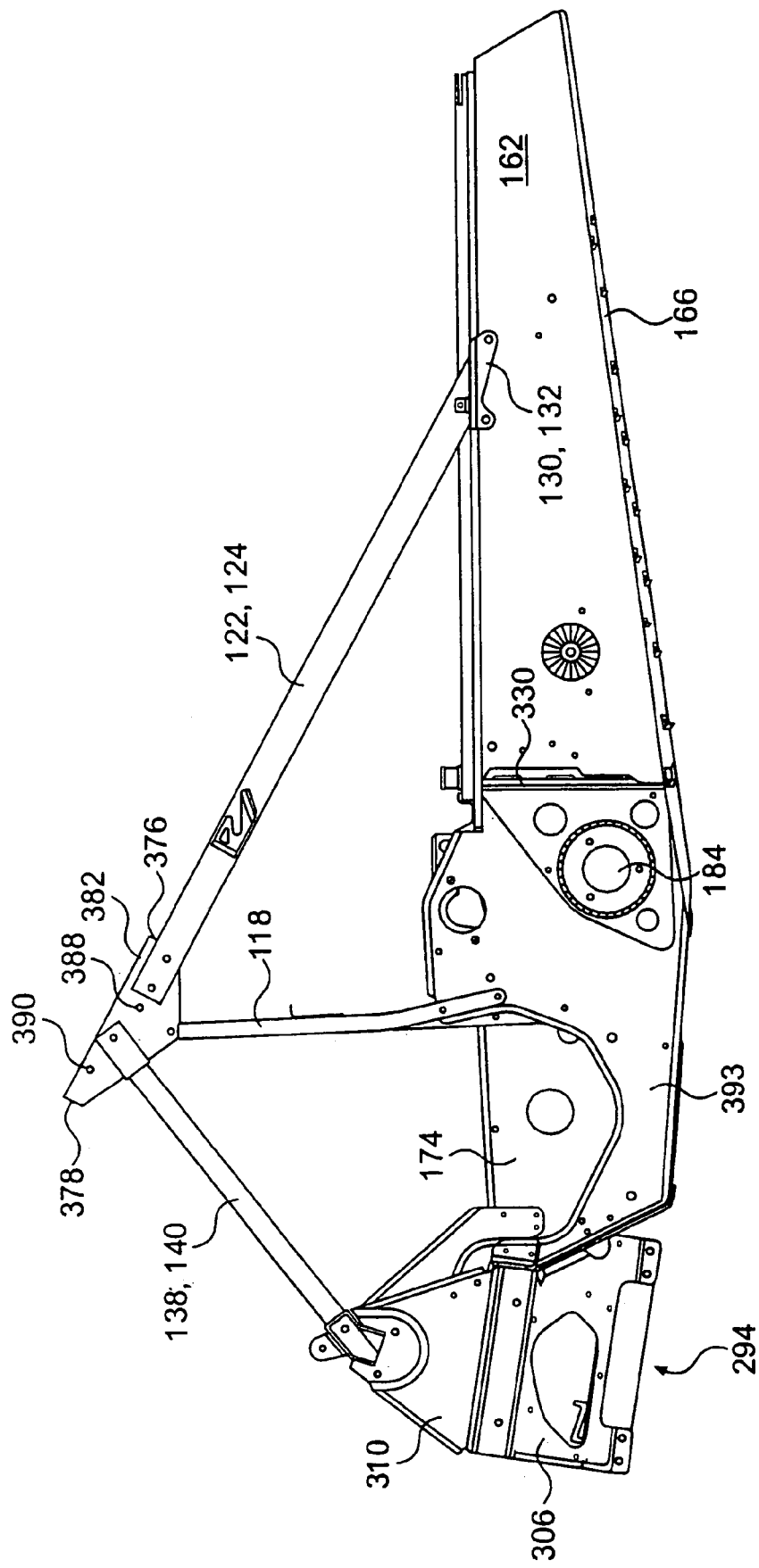
FIG. 29 is a side view illustration of the frame assembly shown in FIG. 28.
Figure 30:
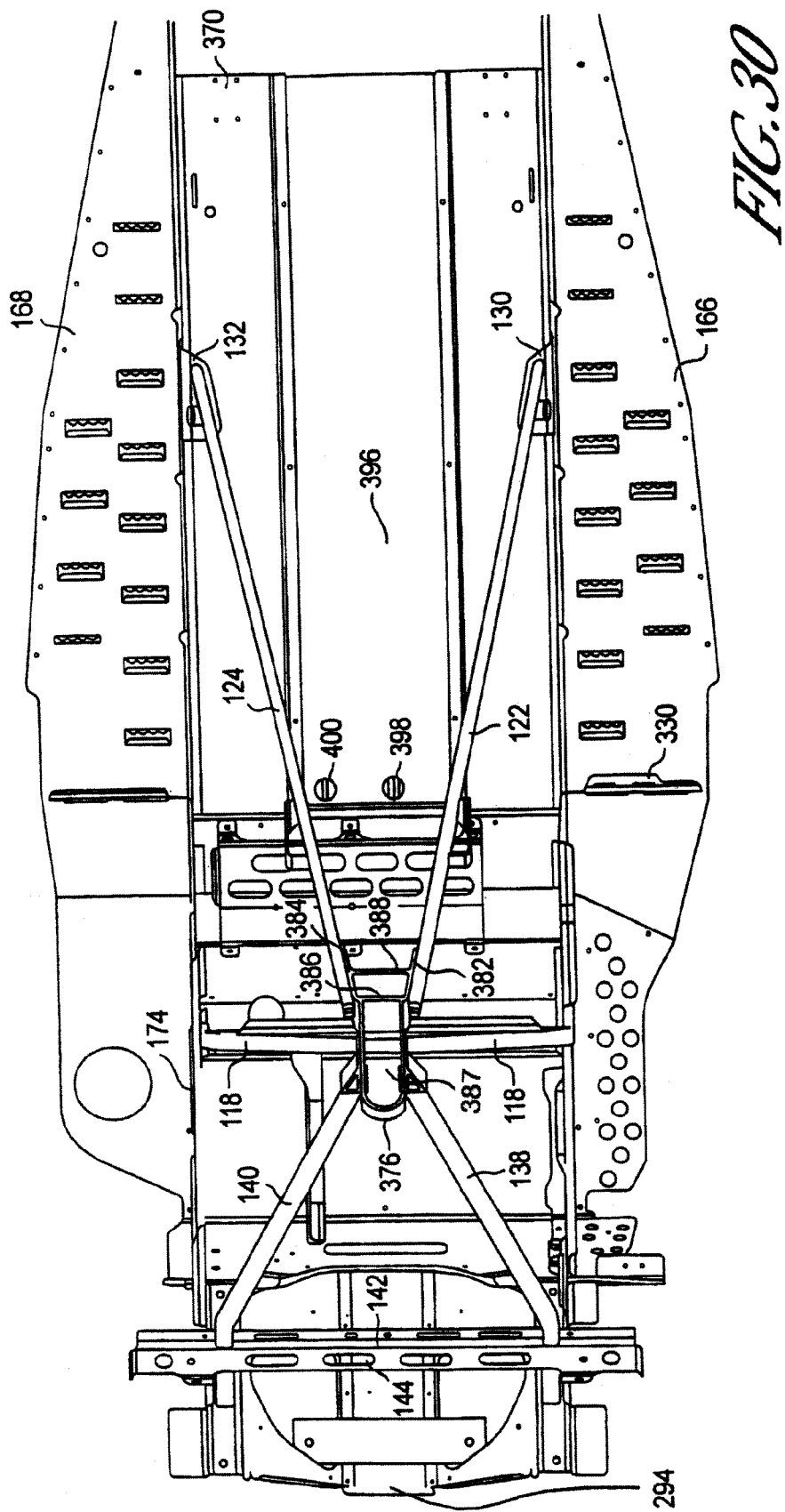
FIG. 30 is a top view of the frame assembly depicted in FIG. 28.

Variable geometry steering bracket 374 is essentially a U-shaped element with a rear end 376 and a forward end 378. At rear end 376, a first cross-member 380 extends between left and right legs 382, 384 of variable geometry steering bracket 374 to define a closed structure. A second cross member 386 extends between left and right legs 382, 384 forward of first cross member 380 and defines a U-shaped opening 387 toward forward end 378 of variable geometry steering bracket 374. A first pair of holes 388 and a second pair of holes 390 are disposed through left and right legs 382, 382 of variable geometry steering bracket 374 and provide separate attachment points for steering shaft 364. FIG. 29 illustrates the same structures in side view and FIG. 30 illustrates the same structures in top view.

This embodiment of the frame assembly of the present invention differs from the previous embodiments in a few respects. First, left engine cradle wall 393 includes a C-shaped opening 392 instead of opening 182. C-shaped opening 392 facilitates maintenance of an engine (not shown) in engine cradle 394. Second, an elongated radiator 396 is integrated into tunnel 370. Radiator 396 includes an inlet 398 and an outlet 400 that are connected to the cooling system of the engine to assist in reducing the temperature of the coolant therein. To facilitate dissipation of heat, radiator 396 includes fins 402 on its underside.

Figure 31:
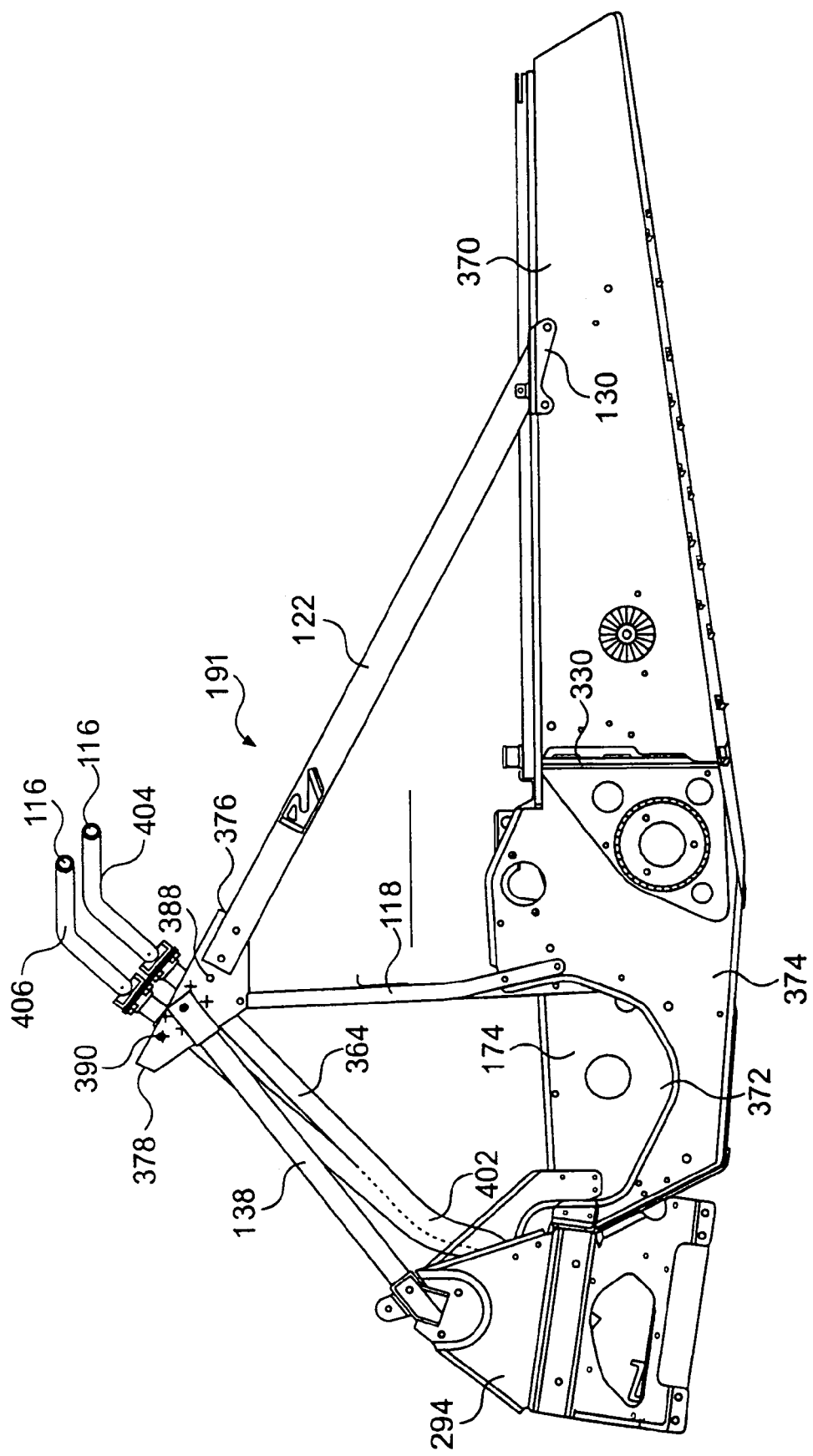
FIG. 31 is a side view illustration of the frame assembly shown in FIG. 29, illustrating the variable positioning of the handlebars that is possible with this embodiment of the present invention.

FIG. 31 provides another side view of the frame assembly of the present invention and illustrates the two positions of steering shaft 364 made possible by the construction of variable geometry steering bracket 374. To accommodate the variable geometry of steering shaft 362 and handlebars 116, steering shaft 364 includes a bend 402 at its lower end. Steering shaft 364 passes through a bearing or bushing (not shown) at its upper end that is connected to variable geometry steering bracket 374 at either of first or second pairs of holes 388, 390. By selecting either first or second pairs of holes 388, 390, first and second handlebar positions 404, 406 are selectable. As would be recognized by those skilled in the art, however, variable geometry steering bracket 374 may be provided with greater that two pairs of holes 388, 390 to further increase the variability handlebars 116. Also, variable geometry steering bracket 374 may be provided with a construction that permits infinite variation of the position of handlebars, as would be understood by those skilled in the art, should such a construction be desired.

Figure 32:
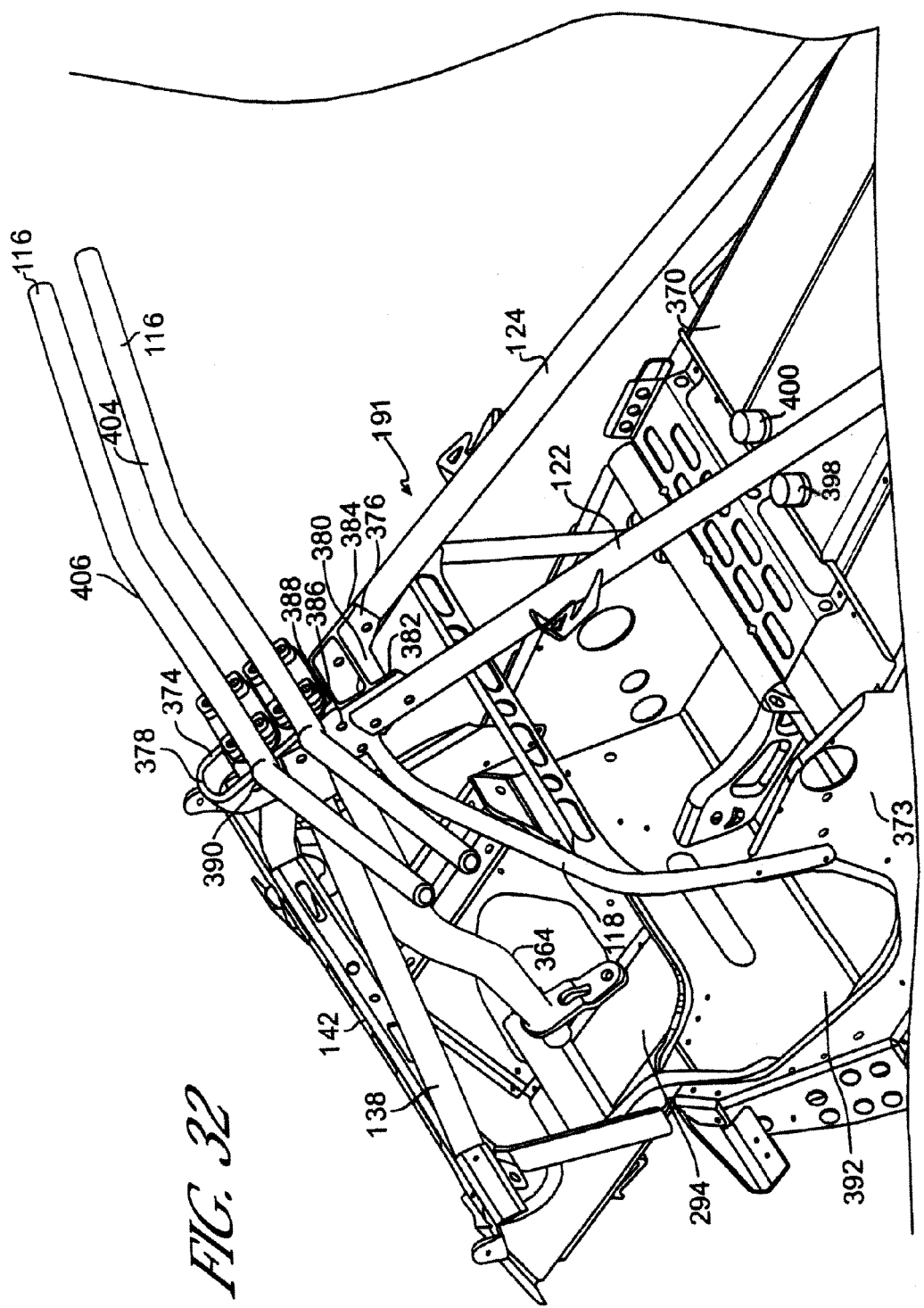
FIG. 32 is a perspective illustration of the embodiment shown in FIG. 31, showing in greater detail the variations in positioning of the handlebars that is made possible by the construction of the present invention.
Figure 33:
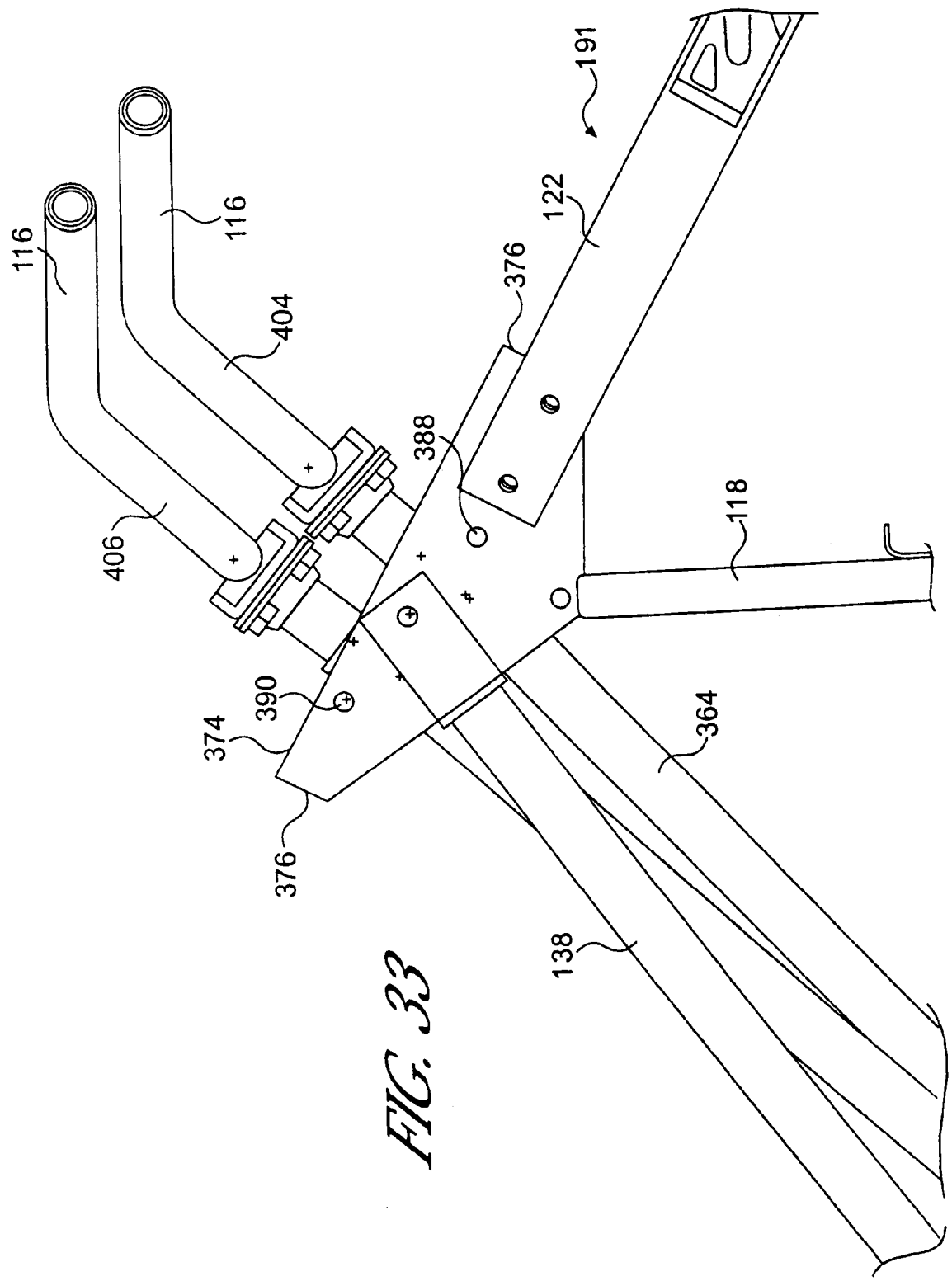
FIG. 33 is a close-up side-view detail of the connection point between the handlebars and the frame assembly of the present invention, illustrating the variable positioning of the handlebars.
Figure 34:
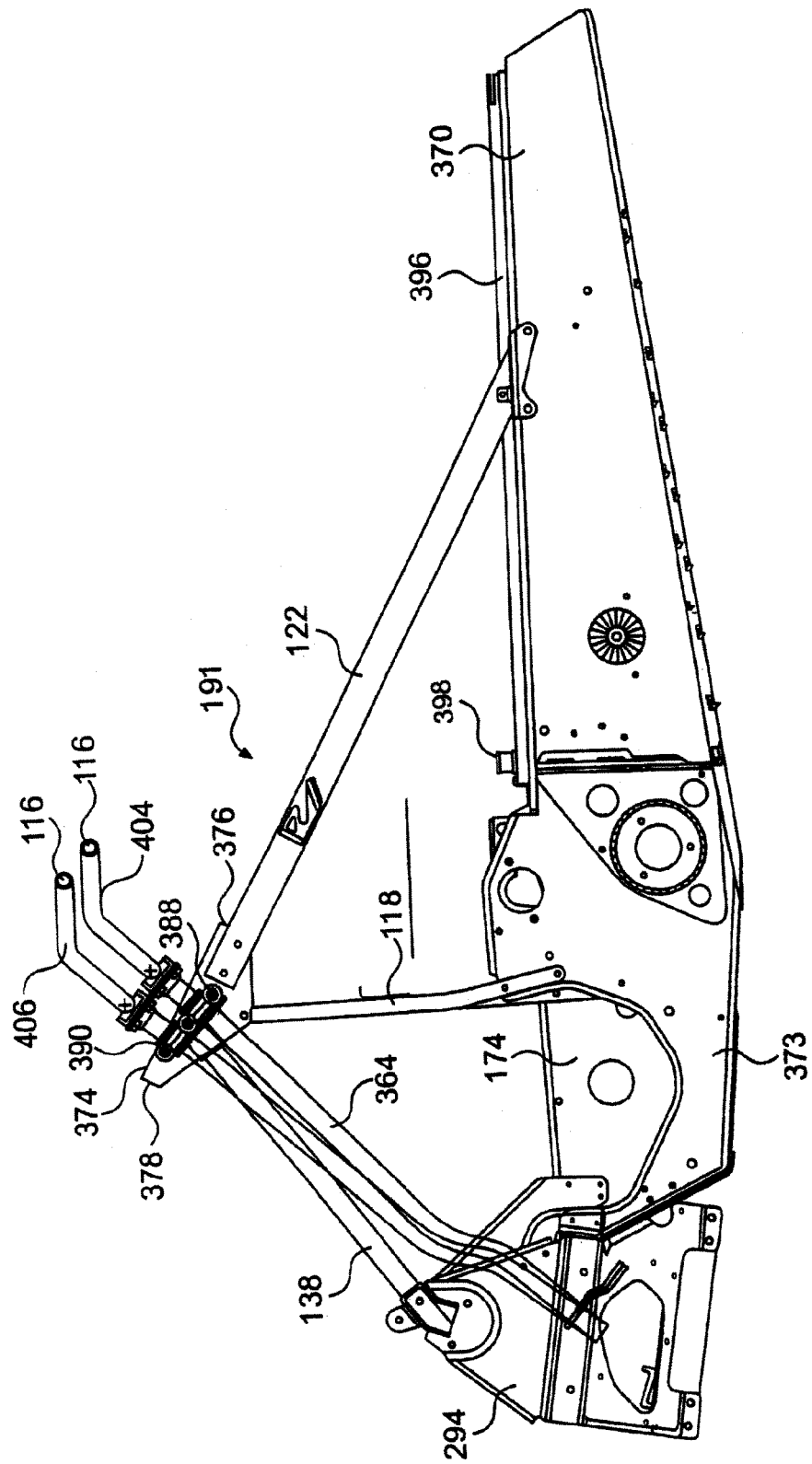
FIG. 34 is a further illustration of the variable positioning feature of the present invention.

FIGS. 32–34 provide additional views of the variable positioning of the handlebars 116 to facilitate an understanding of the scope of the present invention.

Frame assembly 84, 190, 191 of the present invention uniquely distributes the weight loaded onto the vehicle, whether it is snowmobile 22 or one of wheeled vehicles 332, 356. Each of the main components of the frame assembly 84, 190, 191 forms a triangular or pyramidal configuration. All of the bars of the frame assembly 84, 190, 191 work only in tension and compression, without bending. Therefore, each bar of frame assembly 84, 190, 191 intersects at a common point, the bracket 126 (in the non-variable steering geometry) or variable geometry steering bracket 374. With this pyramidal shape, the present invention creates a very stable geometry.

Specifically, the structure of frame assembly 84, 190, 191 enhances the torsional and structural rigidity of the frame of the vehicle. This improves handling. Usually, with a snowmobile, there is only a small torsional moment because the width of the snowmobile is only about 15 inches. An ATV, on the other hand, has a width of about 50 inches and, as a result, experiences a significant torsional moment. Therefore, to construct a frame assembly that is useable in either a snowmobile or an ATV, the frame must be able to withstand the torsional forces associated with an ATV.

Not only does frame assembly 84, 190, 191 reduce torsional bending, it also reduces the bending moment from front to rear. The increased rigidity in both directions further improves handling.

In addition, the creation of frame assembly 84, 190, 191 has at least one further advantage in that the frame can be made lighter and stronger than prior art frame assemblies (such as frame assembly 52, which is illustrated in FIG. 4). In the conventional snowmobile, frame assembly 52 included a tunnel 54 and an engine cradle 56 that were riveted together. Because frame assembly 84, 190, 191 adds strength and rigidity to the overall construction and absorbs and redistributes many of the forces encountered by the frame of the vehicle, the panels that make up the tunnel 86 and the engine cradle 88 need not be as strong or as thick as was required for the construction of frame assembly 52.

In the front of the vehicle, left and right shock absorbers 326, 328 are connected to forward support assembly 134 so that the forces experienced by left and right shock absorbers 326, 328 are transmitted to frame assembly 84, 190, 191. In the rear of the vehicle, the left and right braces 122, 124 are orientated with respect to the rear suspension. Upper column 118 is positioned close to the center of gravity of the vehicle's sprung weight. The sprung weight equals all of the weight loaded onto the vehicle's entire suspension. The positioning of these elements such that they transmit forces encountered at the front, middle and rear of the vehicle to an apex creates a very stable vehicle that is capable of withstanding virtually any forces that the vehicle may encounter during operation without sacrificing vehicle performance.

FIG. 35 illustrates the degree to which the rigidity of a frame constructed according to the teachings of the present invention is improved. The highest line on the graph shows that for a 100 kg load, the vertical displacement of the frame of the present invention is only −2 mm. However, in the prior art Bombardier ZX™ model snowmobile, a load of only 50 kg produced a vertical displacement of −6 mm. In addition, a load of about 30 kg on the frame for the prior art Arctic Cat® snowmobile produced a vertical displacement of −6 mm. In other words, the structural rigidity of the frame assembly of the present invention is greatly improved.

While the invention has been described by way of example embodiments, it is understood that the words which have been used herein are words of description, rather than words of limitation. Changes may be made, within the purview of the appended claims without departing from the scope and the spirit of the invention in its broader aspects. Although the invention has been described herein with reference to particular structures, materials, and embodiments, it is understood that the invention is not limited to the particulars disclosed.

What is claimed is:

1. A snowmobile, comprising:
    a frame including a tunnel and an engine cradle forward of the tunnel;
    an engine mounted in the engine cradle;
    a drive track disposed below and supported by the tunnel and connected operatively to the engine for propulsion of the snowmobile;
    left and right skis disposed on the frame;
    a straddle seat disposed on the tunnel above the drive track and rearward of the engine;
    a pair of footrests supported by the frame;
    a steering column movably connected to the frame other than via a head tube and operatively connected to the two skis;
    a handlebar connected to the steering column;
    a pyramidal brace assembly connected to the frame, the assembly including:
        left and right rear legs extending forwardly and upwardly from the tunnel, each of the left and right rear legs having a front end and a rear end, the rear ends of the rear legs being spaced further from each other than the front ends of the rear legs, and
        left and right front legs extending rearwardly and upwardly from the frame forward of the tunnel, each of the left and right front legs having a front end and rear end, the front ends of the front legs being spaced further from each other than the rear ends of the front legs.

2. The snowmobile of claim 1, wherein the pyramidal brace assembly further includes a cross-member interconnecting the front legs.

3. The snowmobile of claim 1, wherein the legs of the pyramidal brace assembly form an apex not forward of the engine.

4. The snowmobile of claim 1, wherein the front legs of the pyramidal brace assembly are forward of and above the steering column.

5. The snowmobile of claim 1, wherein the rear ends of the front legs of the pyramidal brace assembly and the front ends of the rear legs of the pyramidal brace assembly are interconnected.

6. The snowmobile of claim 1, wherein the rear ends of the front legs of the pyramidal brace assembly and the front ends of the rear legs of the pyramidal brace assembly are interconnected and form an apex not forward of the engine.

7. The snowmobile of claim 6, further comprising an upper column extending upwardly from the frame.

8. The snowmobile of claim 7, wherein the upper column forms the apex with the front ends of the rear legs of the pyramidal brace assembly and the rear ends of the front legs of the pyramidal brace assembly.

9. The snowmobile of claim 2, wherein:
the frame further includes a sub-frame forward of the engine cradle,
the snowmobile further comprises left and right suspension arms pivotally connected to the sub-frame on respective sides of the sub-frame, and
the left and right skis are disposed on the frame via a connection to the respective suspension arm.

10. The snowmobile of claim 3, wherein:
the frame further includes a sub-frame forward of the engine cradle,
the snowmobile further comprises left and right suspension arms pivotally connected to the sub-frame on respective sides of the sub-frame, and
the left and right skis are disposed on the frame via a connection to the respective suspension arm.

11. The snowmobile of claim 4, wherein:
the frame further includes a sub-frame forward of the engine cradle,
the snowmobile further comprises left and right suspension arms pivotally connected to the sub-frame on respective sides of the sub-frame, and
the left and right skis are disposed on the frame via a connection to the respective suspension arm.

12. The snowmobile of claim 5, wherein:
the frame further includes a sub-frame forward of the engine cradle,
the snowmobile further comprises left and right suspension arms pivotally connected to the sub-frame on respective sides of the sub-frame, and
the left and right skis are disposed on the frame via a connection to the respective suspension arm.

13. The snowmobile of claim 6, wherein:
the frame further includes a sub-frame forward of the engine cradle,
the snowmobile further comprises left and right suspension arms pivotally connected to the sub-frame on respective sides of the sub-frame, and
the left and right skis are disposed on the frame via a connection to the respective suspension arm.

14. The snowmobile of claim 7, wherein:
the frame further includes a sub-frame forward of the engine cradle,
the snowmobile further comprises left and right suspension arms pivotally connected to the sub-frame on respective sides of the sub-frame, and
the left and right skis are disposed on the frame via a connection to the respective suspension arm.

15. The snowmobile of claim 8, wherein:
the frame further includes a sub-frame forward of the engine cradle,
the snowmobile further comprises left and right suspension arms pivotally connected to the sub-frame on respective sides of the sub-frame, and
the left and right skis are disposed on the frame via a connection to the respective suspension arm.

* * * * *

(12) EX PARTE REEXAMINATION CERTIFICATE (10579th)
United States Patent
Girouard et al.

(10) Number: US 7,124,847 C1
(45) Certificate Issued: *Apr. 27, 2015

(54) FRAME CONSTRUCTION FOR A VEHICLE

(75) Inventors: Bruno Girouard, Montreal (CA);
Berthold Fecteau, Richmond (CA);
Jérôme Wubbolts, Orford (CA);
Anne-Marie Dion, Granby (CA)

(73) Assignee: BANK OF MONTREAL, Toronto (CA)

Reexamination Request:
No. 90/013,397, Nov. 14, 2014

Reexamination Certificate for:
Patent No.: 7,124,847
Issued: Oct. 24, 2006
Appl. No.: 11/127,152
Filed: May 12, 2005

( * ) Notice: This patent is subject to a terminal disclaimer.

Related U.S. Application Data

(63) Continuation of application No. 09/877,212, filed on Jun. 11, 2001, now Pat. No. 7,469,764, and a continuation-in-part of application No. 09/472,133, filed on Dec. 23, 1999, now abandoned.

(60) Provisional application No. 60/237,384, filed on Oct. 4, 2000.

(30) Foreign Application Priority Data

Dec. 23, 1998 (CA) ..................................... 2256944

(51) Int. Cl.
*B62M 27/02* (2006.01)
*B62J 35/00* (2006.01)
*B62K 5/05* (2013.01)

(52) U.S. Cl.
CPC ... *B62J 35/00* (2013.01); *B62K 5/05* (2013.01)

(58) Field of Classification Search
None
See application file for complete search history.

(56) References Cited

To view the complete listing of prior art documents cited during the proceeding for Reexamination Control Number 90/013,397, please refer to the USPTO's public Patent Application Information Retrieval (PAIR) system under the Display References tab.

*Primary Examiner* — William Doerrler

(57) ABSTRACT

A frame assembly is described including a tunnel, an engine cradle disposed forward of the tunnel and connected thereto, and a sub-frame disposed forward of the engine cradle and connected thereto. A forward support assembly extends upwardly from the subframe. An upper column extends upwardly from the engine cradle to connect with the forward support assembly. A rear brace assembly extends upwardly from the tunnel to connect with the forward support assembly and the upper column. In one embodiment, the frame assembly further includes an engine disposed in the engine cradle. An endless track is operatively connected to the engine and disposed beneath the tunnel for propulsion. A pair of skis is operatively connected to a steering device for steering. In another embodiment, the frame assembly further includes an engine disposed in the engine cradle. A rear wheel is operatively connected to the engine and disposed beneath the tunnel for propulsion, and two front wheels are operatively connected to a steering device for steering.

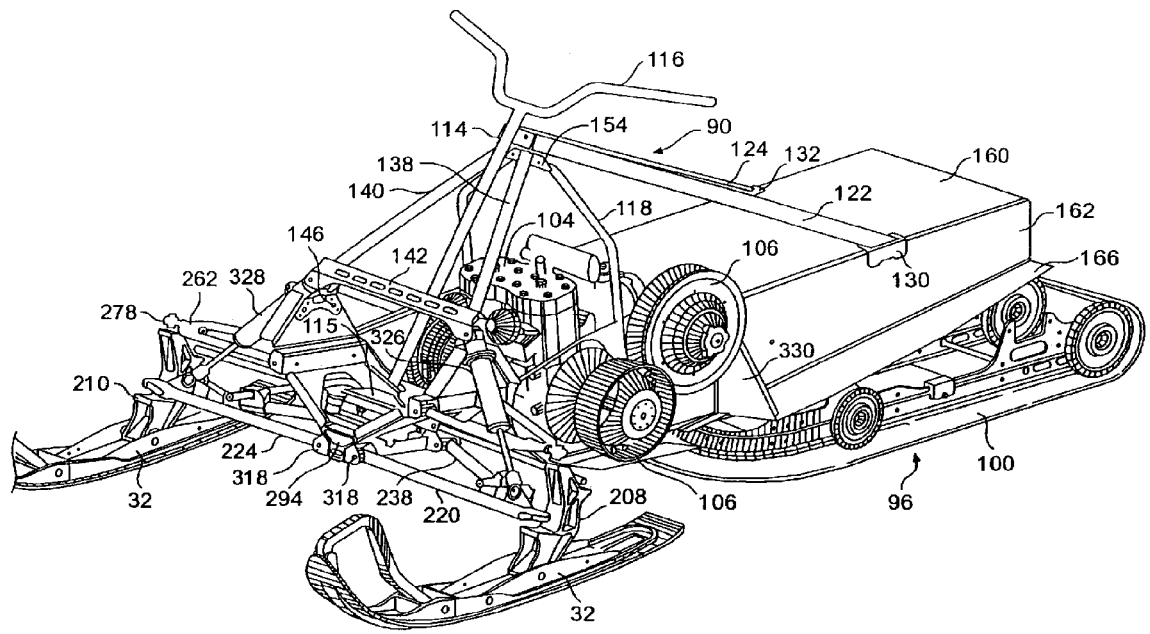

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3, 5-10 and 12-15 is confirmed.

Claims 4 and 11 were not reexamined.

* * * * *

(12) EX PARTE REEXAMINATION CERTIFICATE (10837th)
United States Patent
Girouard et al.

(10) Number: US 7,124,847 C2
(45) Certificate Issued: *Mar. 30, 2016

(54) FRAME CONSTRUCTION FOR A VEHICLE

(75) Inventors: Bruno Girouard, Montreal (CA);
Berthold Fecteau, Richmond (CA);
Jérôme Wubbolts, Orford (CA);
Anne-Marie Dion, Granby (CA)

(73) Assignee: BANK OF MONTREAL, Toronto (CA)

Reexamination Request:
No. 90/013,639, Nov. 30, 2015

Reexamination Certificate for:
Patent No.: 7,124,847
Issued: Oct. 24, 2006
Appl. No.: 11/127,152
Filed: May 12, 2005

Reexamination Certificate C1 7,124,847 issued Apr. 27, 2015

(*) Notice: This patent is subject to a terminal disclaimer.

Related U.S. Application Data

(63) Continuation of application No. 09/877,212, filed on Jun. 11, 2001, now Pat. No. 7,469,764, and a continuation-in-part of application No. 09/472,133, filed on Dec. 23, 1999, now abandoned.

(60) Provisional application No. 60/237,384, filed on Oct. 4, 2000.

(30) Foreign Application Priority Data

Dec. 23, 1998 (CA) ...................................... 2256944

(51) Int. Cl.
*B62M 27/02* (2006.01)
*B62K 5/05* (2013.01)
*B62K 5/027* (2013.01)
*B62J 35/00* (2006.01)

(52) U.S. Cl.
CPC . *B62K 5/05* (2013.01); *B62J 35/00* (2013.01); *B62K 5/027* (2013.01); *B62M 27/02* (2013.01)

(58) Field of Classification Search
None
See application file for complete search history.

(56) References Cited

To view the complete listing of prior art documents cited during the proceeding for Reexamination Control Number 90/013,639, please refer to the USPTO's public Patent Application Information Retrieval (PAIR) system under the Display References tab.

*Primary Examiner* — Peter C English

(57) ABSTRACT

A frame assembly is described including a tunnel, an engine cradle disposed forward of the tunnel and connected thereto, and a sub-frame disposed forward of the engine cradle and connected thereto. A forward support assembly extends upwardly from the subframe. An upper column extends upwardly from the engine cradle to connect with the forward support assembly. A rear brace assembly extends upwardly from the tunnel to connect with the forward support assembly and the upper column. In one embodiment, the frame assembly further includes an engine disposed in the engine cradle. An endless track is operatively connected to the engine and disposed beneath the tunnel for propulsion. A pair of skis is operatively connected to a steering device for steering. In another embodiment, the frame assembly further includes an engine disposed in the engine cradle. A rear wheel is operatively connected to the engine and disposed beneath the tunnel for propulsion, and two front wheels are operatively connected to a steering device for steering.

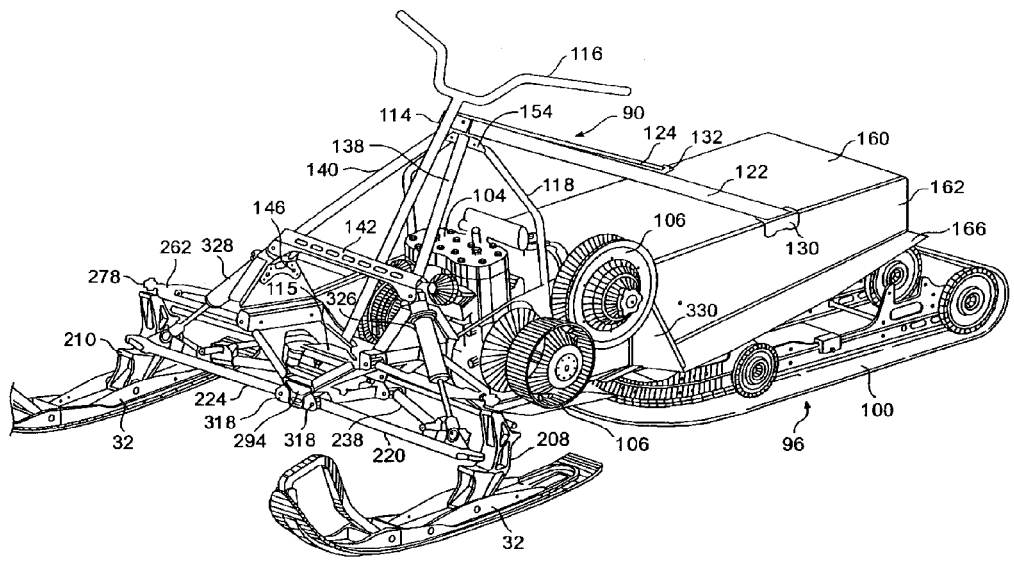

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-15 is confirmed.

* * * * *